United States Patent [19]
Liu et al.

[11] Patent Number: 5,754,540
[45] Date of Patent: May 19, 1998

[54] EXPANDABLE INTEGRATED CIRCUIT MULTIPORT REPEATER CONTROLLER WITH MULTIPLE MEDIA INDEPENDENT INTERFACES AND MIXED MEDIA CONNECTIONS

[75] Inventors: Chang-Chi Liu, Fremont, Calif.; Ming-Chang Su, Hsinchu; Jung-Yu Lee, Taichung, both of Taiwan

[73] Assignee: Macronix International Co., Ltd., Hsinchu, Taiwan

[21] Appl. No.: 503,648

[22] Filed: Jul. 18, 1995

[51] Int. Cl.$^6$ .................. H04J 3/26; H04L 12/56
[52] U.S. Cl. .................. 370/315; 370/492; 370/463; 370/279; 370/501; 375/211
[58] Field of Search .............. 375/211; 370/75, 370/97, 85.13, 85.14, 94.1, 94.2, 274, 293, 315, 492, 501, 408, 419, 438, 447, 463, 279; 455/7, 17, 20, 22, 23

[56] References Cited

U.S. PATENT DOCUMENTS

| | | |
|---|---|---|
| 4,825,435 | 4/1989 | Amundsen et al. |
| 5,265,123 | 11/1993 | Vijeh et al. ............... 375/3 |
| 5,299,195 | 3/1994 | Shah . |
| 5,396,495 | 3/1995 | Moorwood et al. ......... 370/85.11 |
| 5,541,957 | 7/1996 | Lau .......................... 375/258 |
| 5,557,633 | 9/1996 | Staab et al. |

OTHER PUBLICATIONS

Draft Supplement to 1993 version of ANSI/IEEE Std. 802.3, "MAC Parameters, Physical Layer, Medium Attachment Units and Repeater for 100 Mb/s Operation (version 3.0)", IEEE Computer Society, pp. 1-29-11, Oct 30, 1994 (unapproved draft).

*Primary Examiner*—Wellington Chin
*Assistant Examiner*—Jean B Corrielus
*Attorney, Agent, or Firm*—Wilson Sonsini Goodrich & Rosati

[57] ABSTRACT

A 100BASE-T compliant integrated circuit multiport repeater provides one or more medium independent interfaces (MII's) and a plurality of physical interfaces. This facilitates connection of the repeater to one or more external medium access controller devices also implementing the MII standard. The multiport repeater device shares status, configuration and control management function of the MII among the plurality of physical ports. Therefore, only one MII physical address is needed for each multiport repeater, rather than for each physical transceiver in the system. The medium independent interfaces on the repeater chip share a number of pins and logic so that the total number of I/O pins required for a repeater chip according to the present invention with multiple medium independent interfaces is substantially reduced over a similar device which might have a plurality of independent medium independent interfaces. The user of the repeater is capable of configuring the chip to handle a variety of different kinds of physical communication medium on a port by port basis, using the MII management bus.

33 Claims, 8 Drawing Sheets

EXPANDABLE INTEGRATED CIRCUIT MULTIPORT REPEATER CONTROLLER WITH MULTIPLE MEDIA INDEPENDENT INTERFACES AND MIXED MEDIA CONNECTIONS

BACKGROUND OF THE INVENTION

1. Field of the Invention

The present invention relates to computers in local area networks; and more particularly to integrated circuit multiport repeaters for use with standard Ethernet type networks, including emerging 100 MegaHertz Ethernet standards.

2. Description of Related Art

Multiport repeaters, also referred to as hubs or wiring concentrators, are in widespread use in local area networks. These devices allow interconnection of a number of network segments at the physical layer of the network protocol. Thus, in an Ethernet type network, all of the devices coupled to a single repeater fall within the same collision detect domain for the physical layer of the local area network. See for example, U.S. Pat. No. 5,265,123, entitled EXPANDABLE REPEATER.

An emerging standard carrier sense multiple access with collision detect (CSMA/CD) protocol for 100 megabit per second data transmission is known as 100BASE-T. The standard has been defined by the Institute of Electrical and Electronic Engineers as standard 802.3u.

The 100BASE-T standard specifies a medium independent interface MII between a medium access controller MAC and a physical transceiver interface PHY. A medium independent interface is designed so that a device which incorporates the medium access controller will have an interface independent of the particular type of physical medium to which a physical transceiver is attached. The medium independent interface is desirable because the 100BASE-T standard supports a variety of different types of communication media. Thus, physical transceivers will provide for translation of the physical interface to the medium independent interface. The device carrying medium access controller will translate signals from the MAC level to the medium independent interface. By providing a common interface to the medium access control functions, manufacturers can make their devices work together more easily.

The 100BASE-T standard defines a reconciliation sublayer and a media independent interface in OSI reference model physical layer. The media access controller is found at the data link layer of the device and drives a medium independent interface (MAC-MI). In the physical layer, a complementary medium independent interface (PHY-MII) connects to physical layer medium dependent circuitry. This circuitry is coupled with physical medium attachment circuitry, and physical coding sublayer logic. The physical coding sublayer logic drives the medium independent interface.

Within the 100BASE-T standard, several physical media are specified. The 100BASE-FX standard is a physical layer specification for 100 megabit per second CSMA/CD LAN over two optical fibers. The 100BASE-T4 specification provides for 100 megabit per second CSMA/CD LAN over four pairs of category III, IV, and V, UTP wire. The 100BASE-TX standard is a physical layer specification for a 100 megabit CSMA/CD LAN over two pairs of category V, UTP or STP wire.

The 100BASE-T standard also specifies repeater function for 100 megabit per second baseband networks. The repeater includes a baseband repeater unit at the physical layer interconnecting two medium dependent, physical interfaces. Thus, according to the standard, the repeater unit is coupled with the physical medium attachment circuitry and physical coding sublayer of the medium dependent interfaces for the ports on the repeater. These repeaters are typically designed to be coupled to an integrated transceiver chip, such as an AMD transceiver chips referred to as Am78965 or Am78966 available through Advanced Micro Devices, Sunnyvale, Calif. These chips provide physical layer signals to the repeater baseband unit on which the repeater functions are executed.

The medium independent interface specified according to the standard, provides for a management interface and a physical address for each medium independent interface. This management interface is designed to provide control of a single physical interface at a time, and provides for transfer of control and status information between the physical layer device and the station coupled to the medium independent interface. Control information is driven by the station synchronously with respect to a management data clock, also specified as part of the medium independent interface. The management interface specified in the standard provides a two wire serial interface to connect a management entity and a managed physical interface for the purposes of controlling the physical interface and gathering status information about the physical interface. The management interface provides for a management register set for the physical transceiver device which includes a set of eight control, status and configuration registers, with eight additional locations reserved, and sixteen registers allocated to vendor specific functions.

The standard further specifies a physical address for the physical interface made up of five bits in a management frame to be supplied through the management interface bus. Thus, the five bit physical address assigned to the medium independent interface puts a limit on the number of ports on a single management bus of thirty-two physical transceiver ports.

Thus, while the standard contemplates repeaters having physical interfaces, and a medium independent interface which maps to a single physical interface with a shared management interface among thirty-two physical interfaces, the standard does not provide for easy interconnection of a medium access controller directly to a repeater. Thus, according to the prior art and the promulgated standard, a network management device which may be coupled to a repeater must connect to the repeater through the physical layer interface. Also, other types of network intermediate systems or end stations are only connectable to the repeater through the physical interfaces.

Therefore, although the standard specifies a repeater function for multiport repeaters, the repeater function has limited application, and does not allow for flexible implementation in commercial settings. Thus, it is desirable to provide a more flexible repeater architecture for use with the emerging 100BASE-T standards.

SUMMARY OF THE INVENTION

The present invention provides an integrated circuit multiport repeater providing one or more medium independent interfaces and a plurality of physical interfaces. This facilitates connection of the repeater to an external medium access controller device also implementing the MII standard. The multiport repeater appears to the MAC layer device using the MII like one physical transceiver. However, the integrated multiport repeater of the present invention shares a single MII interface among multiple physical transceivers.

While the standard for the MII interface provides for management of the status, configuration and control of a physical interface, the multiport repeater device of the present invention shares this status, configuration and control management function among the plurality of physical ports. Therefore, only one MII physical address is needed for each multiport repeater, rather than for each physical transceiver in the system. This greatly expands the number of ports which may be managed on a single management bus.

In addition, the present invention provides for use of more than one medium independent interface on the multiport repeater. Each of the medium independent interfaces provides access to all of the physical ports on the repeater. This facilitates connection of a number of different medium access control level devices to a single repeater.

According to the present invention multiple MIIs share a set of logic gates and share some of the I/O pins in a single multiport repeater. This brings down the I/O pin count requirement drastically. Without sharing pins, three standard MIIs will require fifty pins (three sets of control/status/pins plus two management pins). According to one implementation of the present invention, only thirty-five pins are needed for three MIIs. The control logic associated with each MII can be shared to reduce the total implementation cost.

A 100BASE-T repeater implemented according to the present invention allows for attaching multiple devices, which have a MAC-MII, to the integrated multiport repeater through multiple PHY-MIIs implemented on the repeater chip. For example, a bridge device can be coupled to the repeater allowing connections to different local area network media. A network management device can be coupled to the repeater to gather statistics on the network activity at the same time as the bridge is connected to the other MII interface.

By providing some port specific registers in the management interface accessible through the medium independent interface on the chip, the user of the present invention is capable of configuring the multiport repeater chip to handle a variety of different kinds of physical communication media on a port by port basis. Thus, the multiport repeater according to the present invention includes circuitry for adapting the physical layer circuitry for each port to meet the medium dependent characteristics specified using the management interface. The integrated circuit repeater according to another aspect of the present invention includes interface control logic, including interface control and status registers for the plurality of medium dependent interfaces. The interface control logic manages the physical layer receive and transmit functions on the plurality of media dependent interfaces for variant types of communication media. A management interface is provided which is coupled to the interface control logic. This management interface is responsive to a repeater address in a management frame received at the management interface to provide read and write access to the interface control and status registers. The control and status registers according to one aspect of the invention include a first set of registers which specify shared attributes of the plurality of media dependent interfaces, and a second set of registers which specify individual attributes of the plurality of media independent interfaces.

A 100BASE-T multiport repeater in one embodiment of the present invention connects to either TX (two pair unshielded medium) media FX (optical fiber) media. It is desirable to connect the different media within one repeater at the same time. The additional FX connection is very useful because fiber media can run over a much longer distance than wire media. For example, an eight port 100BASE-T repeater with six ports connected to TX and two ports connected to FX can be implemented. The integrated multiport repeater provides the feature allowing a user of the repeater to mix TX and FX media on one repeater. Alternative systems can also support the T4 (four pair unshielded wire) medium.

The media dependent characteristics of the physical layer circuitry for the TX and FX media are slightly different. In particular, the TX media connection requires a scrambler in the transmit function and a descrambler in the receive function. The FX media connection does not require the scrambler/descrambler functions. The integrated multiport repeater of the present invention provides a scrambler and descrambler function at every port. This allows every port to be used for TX media. A media type register is also implemented. The width of this register is equal to the number of ports on the repeater. The value of each bit determines whether the scrambler/descrambler functions are bypassed or not for the port. If they are bypassed, then the port connects to an FX transceiver. If not, it is used for a TX transceiver. Thus, by writing to the media type register through the management interface, the user of the repeater can determine on a port by port basis the type of media for which it is adapted.

According to yet another aspect of the present invention, an expansion port is provided on a single multiport repeater, which also includes a plurality of medium independent interfaces. This provides an extremely flexible device which can be used for high speed 100 megabit per second Ethernet type repeater functions in a variety of hardware configurations. Using the expansion port, a number of multiport repeaters each of which is given a separate repeater address according to the present invention, can be cascaded on a single management bus. The repeater address can be specified using the five bit physical address of the medium independent interface standard, which is normally assigned to individual physical interfaces. Using the five bit repeater address uniquely set for a number of cascaded multiport repeaters according to the present invention allows a single management entity to control a very large number of physical ports by cascading thirty-two multiport repeaters. If there are eight physical ports per repeater, 256 physical ports can be managed through a shared management interface. With a larger number of ports per repeater, even larger number of physical interfaces can be managed according to this aspect of the invention.

The expansion port of the present invention includes at least two unique characteristics. In particular, the expansion port control logic in the core state machine of the multiport repeater of the present invention runs at a clock speed twice the rate of the data transferred on the other ports of the device. The faster clock at the expansion port reduces the arbitration time between two cascaded repeater chips by about one half. Thus, the so-called collision detect domain of Ethernet, limited by propagation time, is extended across repeater boundaries. Making the expansion port run at a higher rate than the physical ports on the repeater allows a greater number of devices within the single domain.

Furthermore, the expansion port of the present invention, provides for exchanging information not only about collisions within the domain, but about degraded signal reception as well at ports in the respective repeaters through the expansion port. In the 100BASE-T standard, exchanging collision information alone is not enough to make all discrete repeaters work together. Rather, a carrier integrity monitor state machine, specified according to the standard requires a jam sequence to be transmitted to all ports if a degraded signal is received at any one port. Thus, the forced jam sequence is communicated through an expansion port according to the present invention to allow cascading of repeaters.

Accordingly, the present invention provides an extremely flexible repeater chip for use with high speed local area networks. The repeater can be expanded, and connects to a plurality of media independent interfaces allowing powerful network architectures.

Other aspects and advantages of the present invention can be seen upon review of the figures, the detailed description, and the claims which follow.

DETAILED DESCRIPTION

Figure 1:
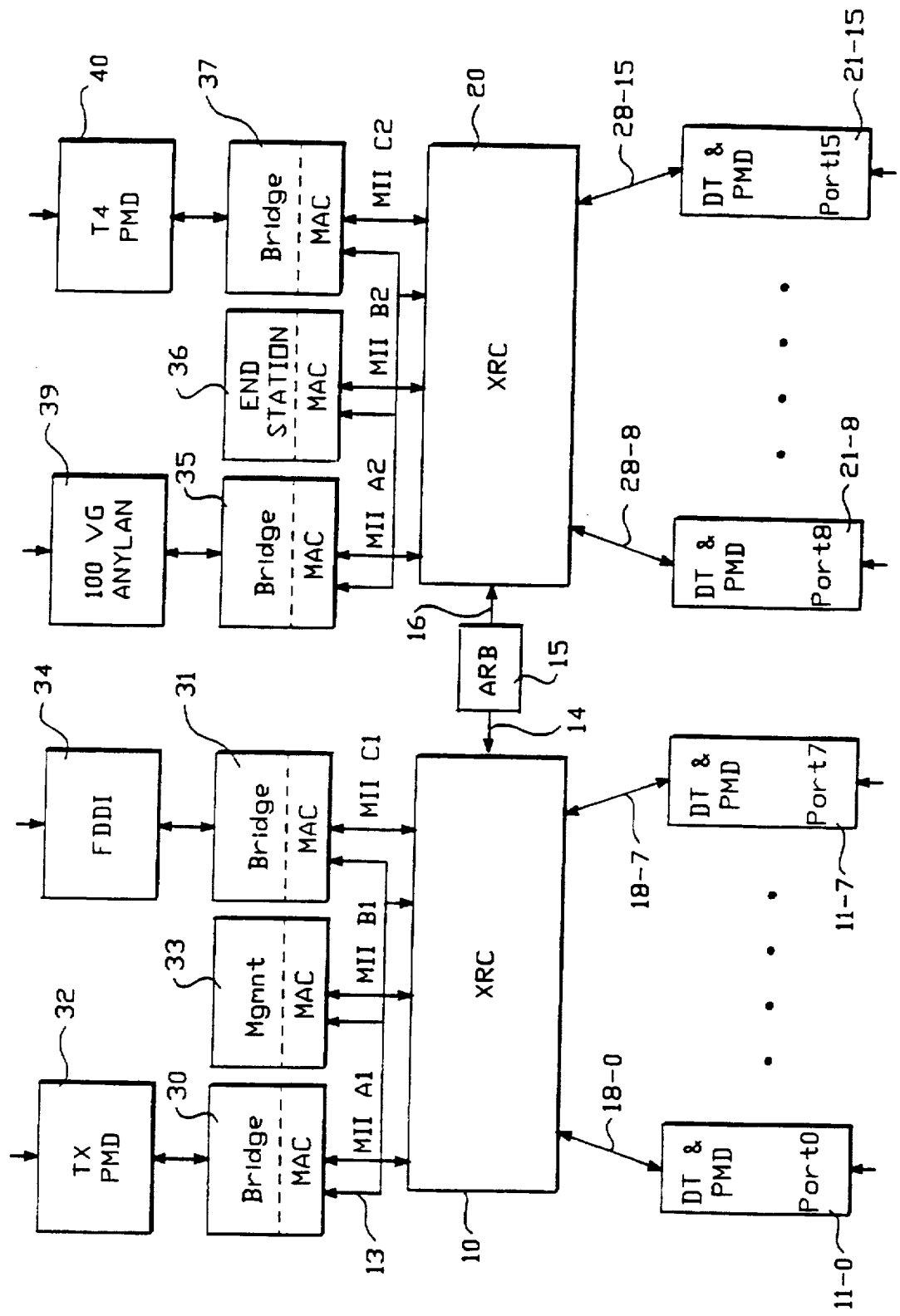
FIG. 1 is a block diagram of a system incorporating the multiport repeaters of the present invention.

A detailed description of the preferred embodiment of the present invention is provided with reference to the figures. FIG. 1 illustrates a context for use of the multiport repeater according to the present invention. FIGS. 2 through 8 illustrate the architecture of the multiport repeater according to a preferred embodiment. FIG. 9 illustrates the arbitration logic used for the expansion port on the multiport repeater according to one embodiment of the present invention.

As can be seen in FIG. 1, the present invention provides a multiport repeater XRC 10 which supports eight 100BASE-TX or 100BASE-FX ports 18-0 through 18-7. Three media independent interfaces MII-A1 through MII-C1 are coupled to the multiport repeater 10. As indicated by bus 13, the media independent interfaces MII-A1 through MII-C1 include some shared signals on bus 13 to reduce the overall pin count on the multiport repeater 10. In addition, the multiport repeater 10 includes an expansion port 14 which is coupled through arbitration logic 15 to a similar expansion port 16 on an adjacent multiport repeater 20. The multiport repeater 20 also includes a plurality of ports 28-8 through 28-15. Three media independent interfaces MII-A2 through MII-C2 are included on the chip 20.

Each of the ports 18-0 through 18-7 and 28-8 through 28-15 are connected to corresponding port devices 11-0 through 11-7 and 21-8 through 21-15. The port devices 11-0 through 11-7 and 21-8 through 21-15 comprise transceiver integrated circuits, such as the Advanced Micro Devices circuitry referred to above. These circuits are coupled to either a 100BASE-TX or 100BASE-FX communications medium. The ports 18-0 through 18-7 and 28-8 through 28-15 are designed to match the transceiver chips to which they are coupled, and are independent of the particular medium to which the transceiver is connected. Media dependent functions are executed inside the multiport repeater chips 10 and 20 as described below.

Thus, the multiport repeater controller XRC according to the present invention provides a cost-effective single chip device which implements the IEEE 802.3u 100BASE-X repeater functions. Each XRC 10, 20 supports eight 100BASE-TX or 100BASE-FX ports, three MII ports, and one expansion port. Additional management functions can be added to this architecture as suits the needs of a particular implementation.

Multiple MII ports, e.g. MII-A1 through MII-C1, can be connected to a single multiport repeater, e.g. 10. Thus, as shown in FIG. 1, multiport repeater 10 is coupled to a two network intermediate systems, bridge 30 and bridge 31. The bridge 30 can couple the multiport repeater to other types of network physical devices, as indicated by the block 32. This block can be coupled to a 10 megabit Ethernet, or to another 100 megabit Ethernet. Alternatively, the bridge 30 could be adapted to connect to Token Ring or FDDI networks as suits a particular implementation. Similarly, bridge 31 coupled to repeater 10 can be connected to a variety of other types of networks as known in the art such as FDDI interface 34. Finally, coupled to the media independent interface MII-B1, is a management processor 33. This processor includes its own media access control functions as illustrated in the figure and can be utilized for network management functions, such as monitoring network performance gathering statistics, configuring devices in the network, and other processes as desired.

Also as shown in FIG. 1, the second repeater 20 has three media independent interfaces as well. In this example, media independent interface MII-A2 is coupled to a bridge 35, an end station 36 is coupled to media independent interface MII-B2, and another bridge 37 is coupled to media independent interface MII-C2. The bridges 35 and 37 are coupled to physical network media as indicated by boxes 39 and 40. As can be appreciated, the system illustrated in FIG. 1 provides for substantial flexibility in the implementation of a computer network using the 100 megabit 802.3u standard.

Figure 2:
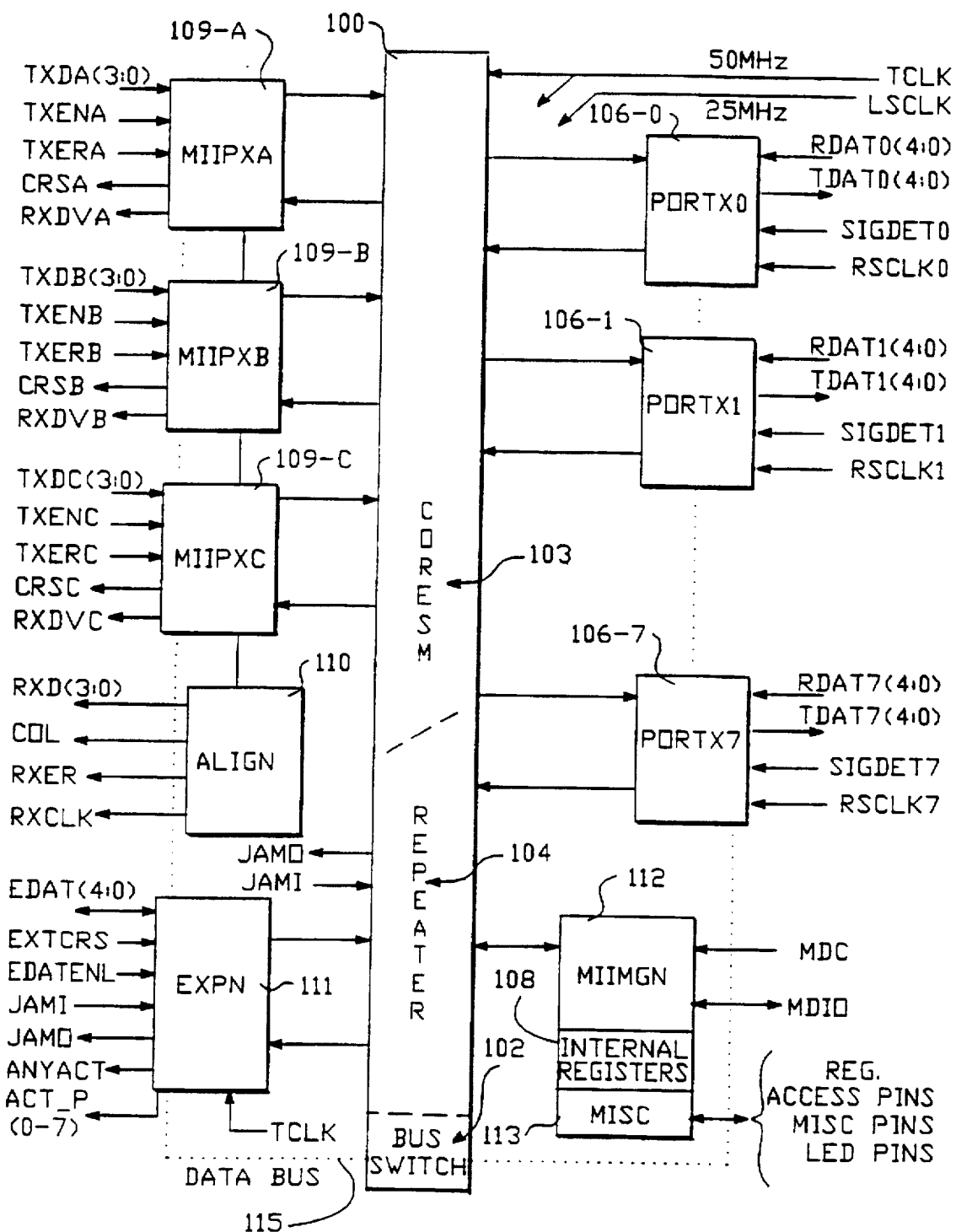
FIG. 2 is a functional block diagram of the integrated circuit multiport repeater according to the present invention.

FIG. 2 is a functional block diagram of the multiport repeater 10 of FIG. 1. The system shown in FIG. 2 is implemented on a single integrated circuit. It includes a core block 100 which includes the clock generator, bus switch 102, a core state machine 103, and a standard 100BASE-X repeater core 104. Coupled with the core block 100 are media dependent port circuitry PORTXn for ports 0 through 7, given reference numbers 106-0 through 106-7 in the figure. Also coupled to the core block 100 are the media independent interface blocks MIIPXi for interfaces A, B, and C given reference numbers 109-A to 109-C respectively. Alignment logic 110 is included which provides a shared output for three media independent interfaces 109-A to 109-C. Also an expansion port function block 111 is incorporated on the chip. Media independent interface control logic 112 is used for accessing the internal registers 108 and other interface service. In addition, miscellaneous functions 113 are provided on the chip.

The expansion port control logic 111 and the core state machine 103 operate at the 50 megaHertz TCLK, twice as fast as the input and output data paths on the physical ports and the media independent interfaces which operate at the 25 megaHertz local symbol clock LSCLK. The 50 megaHertz clock is carefully synchronized with the local symbol clock LSCLK. By transmitting control signals and data across the expansion port 111 at a clock rate faster than the local symbol clock, the communication time among multiple repeater controllers is significantly reduced. This allows the cascading of more repeater controllers within a single collision detect domain, as limited by the collision detect or jam sequence propagation time according to the standard.

The arrows around the perimeter of the block shown in FIG. 2 correspond to pins on the chip. A data bus system represented by line 115 in FIG. 2 routes data among the components of the chip under control of the bus switch circuits 102 in the core state machine 100. Further, the core logic block 100 is coupled to each of the other functional units in the chip as shown schematically in FIG. 2.

The pin definitions on the chip include the following: Front End Interface (Am78965 and Am78966 or MC68836 98 pins

| Pin Name | Type | Description |
|---|---|---|
| TDAT_P[4:0] | O, TTL | Transmit Data. (40 pins) These five outputs per port P (0–7) are 4B/5B encoded transmit data symbols, driven at the rising edge of LSCLK. TDAT4 is the Most Significant Bit. |
| TCLK | I, TTL | Transmit Clock. 50 MHZ clock input. |
| LSCLK | I, TTL | Local Symbol Clock. 25 MHz clock input; divided from the 50 MHz TCLK's rising edge. |
| RDATP_[4:0] | I, TTL | Receive Data. (40 pins) These 5-bit parallel data per port P (0–7) from transceiver are latched by the rising edge of RSCLK. RDAT4 is the Most Significant Bit. |
| RSCLK_P [0:7] | I, TTL | Recovered Symbol Clock. (8 pins) This is a per port P (0–7) 25 MHZ clock, which is derived from the clock synchronized PLL circuit. |
| SIGDET_P | I, TTL | Signal Detect. (8 pins) This per port P (0–7) signal indicates that the received signal is above the detection threshold. |

Media Independent Interfaces (35 pins)

| Pin Name | Type | Description |
|---|---|---|
| TXEN_A | I, TTL | Transmit Enable MII A. Synchronous to the TCLK's rising edge. It is asserted by the MAC with the first nibble of the preamble and remains asserted while all nibbles to be transmitted are presented. |
| TXD_A[3:0] | I, TTL | Transmit Data MII A. (4 pins) Synchronous to the TCLK's rising edge. For each TCLK period in which TXEN is asserted, TXD3–0 are also driven by the MAC. While TXEN is de-asserted, the value of TXD3–0 is ignored. TXD3 is the Most Significant Bit. |
| TXER_A | I, TTL | Transmit Error MII A. Synchronous to the TCLK's rising edge. When TXER is asserted for one or more TCLK period while |

-continued

| Pin Name | Type | Description |
|---|---|---|
| | | TXEN is also asserted, one or more "HALT" symbols will present at TDAT4–0. |
| RXDV_A | O, CMOS | Receive Data Valid MII A. Synchronous to RXCLK's rising edge. This signal remains asserted through the whole frame, starting with the start-of-frame delimiter and excluding any end-of-frame delimiter. High-impedance after reset. |
| CRS_A | O, CMOS | Carrier Sense MII. In TX Mode, synchronous to RXCLK. This pin is asserted when (1) the receiving medium is not idle, or (2) the transmitting medium is not idle in the half-duplex mode. High-impedance after reset. |
| TXEN_B | I, TTL | Transmit Enable MII B. Synchronous to the TXCLK's rising edge. It is asserted by the MAC with the first nibble of the preamble and remains asserted while all nibbles to be transmitted are presented. |
| TXD_B[3:0] | I, TTL | Transmit Data MII B. (4 pins) Synchronous to the TXCLK's rising edge. For each TXCLK period in which TXEN is asserted, TXD3–0 are also driven by the MAC. While TXEN is de-asserted, the value of TXD3–0 is ignored. TXD3 is the Most Significant Bit. |
| TXER_B | I, TTL | Transmit Error MII B. Synchronous to the TXCLK's rising edge. When TXER is asserted for one or more TXCLK period while TXEN is also asserted, one or more "HALT" symbols will present at TXD3–0. |
| RXDV_B | O, CMOS | Receive Data Valid MII B. Synchronous to TXCLK's rising edge. This signal remains asserted through the whole frame, starting with the start-of-frame delimiter and excluding any end-of-frame delimiter. High-impedance after reset. |
| CRS_B | O, CMOS | Carrier Sense MII B. In TX Mode, synchronous to RXCLK. This pin is asserted when (1) the receiving medium is not idle, or (2) the transmitting medium is not idle in the half-duplex mode. High-impedance after reset. |
| TXEN_C | I, TTL | Transmit Enable MII C. Synchronous to the TXCLK's rising edge. It is asserted by the MAC with the first nibble of the preamble and remains asserted while all nibbles to be transmitted are presented. |
| TXD_C[3:0] | I, TTL | Transmit Data MII C. (4 pins) Synchronous to the TXCLK's rising edge. For each TXCLK period in which TXEN is asserted, TXD3–0 are also driving by the MAC. When TXEN is de-asserted, the value of TXD3–0 is ignored. TXD3 is the Most Significant Bit. |
| TXER_C | I, TTL | Transmit Error MII. C. Synchronous to the TXCLK's rising edge. When TXER is asserted for one or more TXCLK period while TXEN is also asserted, one or more "HALT" symbols will present at TXD3–0. |

| Pin Name | Type | Description |
|---|---|---|
| RXDV_C | O, CMOS | Receive Data Valid MII C. Synchronous to RXCLK's rising edge. This signal remains asserted through the whole frame, starting with the start-of-frame delimiter and excluding any end-of-frame delimiter. High-impedance after reset. |
| CRS_C | O, CMOS | Carrier Sense MII C. In TX mode, synchronous to RXCLK. This pin is asserted when (1) the receiving medium is not idle, or (2) the transmitting medium is not idle in the half-duplex mode. High-impedance after reset. |
| RXER | O, CMOS | Receive Error. Synchronous to RXCLK's rising edge. While RXDV is asserted, i.e. a frame is being received, this signal is asserted if any coding error is detected. High impedance after reset. |
| RXCLK | O, CMOS | Receive Clock MII. 25 MHZ continuous clock that provides the timing reference for the transfer of the RXDV, RXD and RXER signals. High-impedance after reset. |
| RXD[3:0] | O, CMOS | Receive Data MII. (4 pins) Synchronous to RXCLK's rising edge. For each RXCLK period in which RXDV is asserted on a given MII, RXD3-0 should be latched by the corresponding MAC. While RXDV is de-asserted, RXD3-0 are the nibbles, 5B/4B decoded from RDAT4-0. RXD[3] is the Most Significant Bit. High-impedance after reset. |
| COL | O, CMOS | Collision MII. This signal is asserted if both the receiving media and TXEN are active or if a forced jam is occurring. High-impedance after reset. |
| MDC | I, TTL | Management Data Clock. The timing reference for MDIO. The minimum high and low times are 200 ns each. No limitation on the maximum high and low time. |
| MDIO | I/O TTL | Management Data Input/Output. A bi-directional signal. After reset, this pin is in high-impedance state. The selection of input/output direction is based on IEEE 802.3u management functions. High-impedance after reset. |

Expansion Port (18 pins)

| Pin Name | Type | Description |
|---|---|---|
| ACT_P | O, CMOS | Activity Out. (8 pins) This is the per port P (0–7) activity of each port synchronous to 50 MHZ clock. It also serves as data framing signal for the packet EDATA. ACT_P leads EDAT's /J/K/ pattern by more than 80 ns and de-asserted 40 ns after the /T/R or the last byte of jam patterns. |
| JAMO | O, CMOS | Jam Out. Active high. The OR'd forced jam signals controlled by Carrier Integrity Monitor of each port. If collision occurs inside the XRC, this pin is also asserted. To prevent deadlocks in external arbitration circuits, JAMO is not asserted if the collision is detected because of assertion of JAMI through the expansion port. |
| ANYACT | O, CMOS | Any Activity. Active high. Asserted if there are any activities in the X-port and MII ports. It also indicates that an XRC is ready to drive data into EDAT. |
| EDAT[4:0] | I/O TTL | Expansion data. (5 pins) Bi-directional 5-wide data. By default, EDAT is an input. It becomes an output as soon as EDATEN is asserted low. An external arbiter coordinates multiple devices on EDAT, and determine which XRC drives the bus. |
| JAMI | I | Force Jam Input. Active high. Asserted by an external arbiter, and XRC will generate JAM patterns to all its ports. |
| EXTCRS | I | External Carrier Sense. Active high. Asserted by an external arbiter indicating activity from other XRC's at the expansion port. |
| EDATEN | I, TTL | Expansion Data Enable. Active low. Asserted by an external arbiter. XRC will drive data into EDAT. |

Register Access Pins (13 pins)

| Pin Name | Type | Description |
|---|---|---|
| LINKGD | O, CMOS | Link Good. Active high. Each port's link integrity status will be displayed at the rising edge REGCK in round-robin fashion starting at Port 0 after STATINI is asserted high. |
| EBOUFLO | O, CMOS | Elastic Buffer Over/Underflow. Active high. Each port's elastic buffer status will be displayed at the rising edge REGCK in round-robin fashion starting at Port 0 after STATINI is asserted high. |
| PART | O, CMOS | Partition. Active high. Each port's partition status will be displayed at the rising edge REGCK in round-robin fashion starting at Port 0 after STATINI is asserted high. |
| JAB | O, CMOS | Jabber. Active high. Each port's partition status will be displayed at the rising edge REGCK in round-robin fashion starting at Port 0 after STATINI is asserted high. |
| DISABLE | O, CMOS | Disable. Active high. Each port's Enable/Disable status will be displayed at the rising edge REGCK in round-robin fashion starting at Port 0 after REGLTCH is asserted high. "1": Disable, "0": enable. |
| ISO | O, CMOS | Isolation. Active high. Each port's isolation status will be displayed at the rising edge REGCK in round-robin fashion starting at Port 0 after REGLTCH is asserted high. |
| SCRAMEN | I/O, | Scrambler. If R-W is high, each port's scrambler status will be displayed at the rising edge |

-continued

| Pin Name | Type | Description |
|---|---|---|
| | | REGCK in round-robin fashion starting at Port 0 after REGLTCH is asserted high. If R-W is low, 8-bit data can be written into the XRC at the rising edge of REGCK in round-robin fashion starting at Port 0 after REGLTCH is asserted high. |
| PORTEN | I/O, | Port Enable, If R-W is high, each port's enable status will be displayed at the rising edge REGCK in round-robin fashion starting at Port 0 after REGLTCH is asserted high. If R-W is low, 8-bit data can be written into the XRC at the rising edge of REGCK in round-robin fashion starting at Port 0 after REGLTCH is asserted high. |
| ISODIS | I/O, | Isolation Disable. If R-W is high, each port's enable status will be displayed at the rising edge REGCK in round-robin fashion starting at Port 0 after REGLTCH is asserted high. If R-W is low, 8-bit data can be written into the XRC at the rising edge of REGCK in round-robin fashion starting at Port 0 after REGLTCH is asserted high. The Carrier Integrity Monitor state machine can be disabled by writing 1's into this pin. |
| PARDIS | I/O, | Partition Disable. If R-W is high, each port's enable status will be displayed at the rising edge REGCK in round-robin fashion starting at Port 0 after REGLTCH is asserted high. If R-W is low, 8-bit data can be written into the XRC at the rising edge of REGCK in round-robin fashion starting at Port 0 after REGLTCH is asserted high. The partition state machine can be disabled by writing 1's into this pin. |
| R-W | I, TTL | Read or Write. High indicates 'Read' Mode; register is being read out. Both REGLTCH and REGCK are outputs. Low indicates 'Write' mode; control registers are being written and both REGLTCH and REGCK are inputs. |
| REGLTCH | I/O, | Register Latch. An output if R-W is high; an input if R-W is low. At the rising edge of REGCK, LINK, EBOUFLO, PART, JAB, ISO display Port 0 status, at the rising edge of next REGCK, Port 1 status is displayed, etc. After Port 7 status is displayed, REGLTCH is asserted at the rising edge of next REGCK. |
| REGCK | I/O, | Register Clock. An output if R-W is high; an input if R-W is low. A clock used as reference to display various status of each port or to latch control information inside XRC. The clock's frequency should be below 40 M Hz. |

LED Pins (9 Pins)

| Pin Name | Type | Description |
|---|---|---|
| ACTLED_P | O, CMOS | Activity LED. (8 pins) These pins signal per port activity by providing a minimum 80 ms ON time (low) and 20 ms OFF time (high) for activities on each port. External buffers are needed to drive LED's. |
| COLLED | O, CMOS | Collision LED. This pin is capable of driving LED directly to display Activity Status. For better visibility, the ON tim enad OFF time of LED's is at least 80 ms and 20 ms respectively. |

Miscellaneous Pins (7 Pins)

| Pin Name | Type | Description |
|---|---|---|
| PHYADDR [4:0] | I | PHYADDR. (5 pins) Each XRC has one 5-bit PHY address as defined in MII. PHY4 is the MSB. In one design, these five pins are eliminated, and the function of supplying the PHY address is done using the ACT_P pins for ports 0 to 4. At power on reset, the PHY address is latched from the ACT_P pins, in this case. |
| ScramCtrl | I | Scrambler Control. If high, the scrambler/descrambler of each port is individually controlled by MII register 17. If low, the scrambler/descramble is bypassed in all the ports. |
| RESET | I, TTL | Reset. Active low. This signal is an output from the system to reset all the logic on the chip. |

The basic operation of multiport repeater is controlled by the core state machine 103 which routes data flow among the plurality of ports 106-0 through 106-7, the expansion port 111, and the three media independent interfaces 109-A through 109-C. The core state machine primarily decides the "copy", "quiet", and "collision" state for each port, the expansion port, and the media independent interface. There are three major states within the core state machine, including one state indicating that there is no activity, another state indicating that one and only one port is receiving data, and another state indicating that more than one port have activity at the same time. According to these three status indications, and which port is receiving, or which ports collide, the repeater core state machine executes the standard repeater functions. The core state machine also generates bus switch control signals and FIFO and buffer data enable signals to enable the data output paths for the ports on the device. The state machine is also utilized to build up clock trees for the TCLK and the LSCLK to manage fanout of these signals.

The basic process core state machine executes the following rules:

1. If only one port is receiving, then copy data of the receiving port to the other idle ports, the MII's and the expansion port. Pins TDAT of the receiving port are kept quiet during reception. After all the data is copied, and an acknowledge is received from all the ports, the expansion port and the media independent interface controllers, then all ports are moved back to the quiet state.
2. If more than one port is active at the same time, then a jam pattern is repeated to each port, including the receiving port. The jam pattern is not specified in the standard. A jam pattern can be used such as 4-3 where 4 corresponds to 01010 and 3 corresponds to 10101.

Thus, the core state machine generates four categories of signals:

1. The copy signals (copy 0 . . . 7, copyep, copyma, copymb, copymc), one for each of the ports, the expansion port, and the three media independent interfaces, which inform the data handlers for the respective ports, to repeat the data from the FIFO buffer to the TDAT outputs.
2. The quiet signals (quiet 0 . . . 7, quietep, quietma, quietmb, quietmc), again one for each of the ports, the expansion port, and the media independent ports, which informs the data handlers to send idle signals to the TDAT outputs.
3. Collision signal (comcol) to inform the data handler to send the jam signals on the TDAT outputs.
4. The FIFO and buffer data enable signals (foen 0 . . . 7, boenep, boenma, boemnb, boenmc), for the FIFOs in the ports, and the buffers for the expansion port and the MII interfaces, to enable the data output paths.

Figure 3:
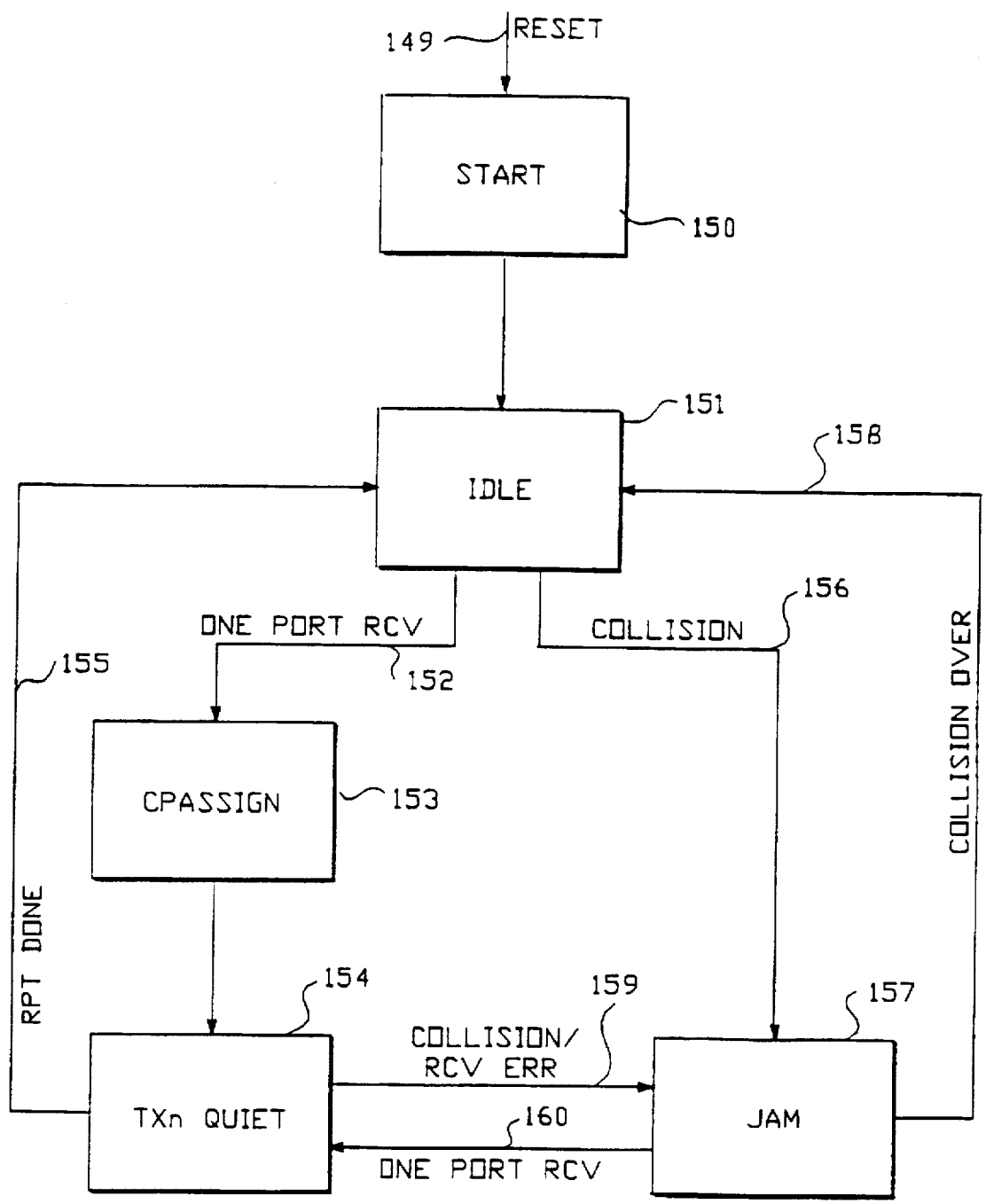
FIG. 3 is a state diagram illustrating operation of the core state machine.

FIG. 3 shows the basic structure of the core state machine. State machine enters a START state 150 in response to a reset signal on the input of the chip as indicated at line 151. After a time-out, the state machine transitions to the IDLE state 151. In the IDLE state, all ports receive the quiet signal (quiet(ALL)=1), all ports have a low copy signal (copy (ALL)=0), there is no collision detected (comcol=0) and the FIFO and buffer output enables for FIFO's on buffers in all ports are set to zero (foen(ALL)=0). If in the IDLE state activity is detected on only one port, then the state transitions on line 152 to the CPASSIGN state 153. In this state, the output enable signal for the receiving port is set high (foen(N)=1) and the data is transferred in to the internal data paths of the device. The copy, collision detect, and output enable signals on all other ports are still low (copy(ALL)=0; comcol=0; foen(ALL except N)=0). The quiet signal on all ports remains high (quiet(ALL)=0). After a short period, the state machine transitions to the transmit and quiet TXn QUIET state 154 in which the copy signal for all ports except the receiving port is set high, the collision signal remains low, the quiet is high only on the receiving port (copy(ALL except N)=1; comcol=0; quiet(N)=1; quiet(ALL except N)=0). After all the ports through which the data is repeated have finished transmitting the data, then the state machine transitions on line 155 back to the IDLE state 151.

If in the IDLE state 151, a collision is detected, then the state machine transitions on line 156 to the JAM state 157. In the JAM state, the collision signal is asserted, the copy signal and quiet signal for all ports is set low, and the output enable signals for all the ports are set high (comcol=1; copy(ALL)=0; quiet(ALL)=0; foen(ALL)=1. Once no activity is detected on any of the incoming ports, the state machine transitions on line 158 back to the IDLE state. If in the TXn QUIET state 154, activity is detected on more than one incoming port, then a collision is detected, and the state machine transitions on line 159 to the JAM state 157. Also if in the JAM state, a change occurs to a condition in which data is being received on only one port, then the state machine transitions on line 160 to the quiet TXn QUIET state 154. This causes the data on the one port to be repeated to the end of the packet even though the first part of the packet was masked by a jam signal.

All the receive functions run on the 25 megaHertz receive clocks. Therefore all the control signals such as the force jam signal and the isolate and carrier presence signal are synchronous with the receive clock. The core functions need a 50 megaHertz clock to reduce the latency. The activity from the receive state machine is sampled by the 50 megaHertz clock which is also used by the repeater core state machine. The elastic buffer depth is dependent on the difference between the receive clock and the transmit clock. By definition they should not differ by more than 100 parts per million. The packet length is 1500 bytes. Thus, a four level elastic buffer in the receive port function should be sufficient.

The repeater core internal data paths are five bits wide. There are eight physical input ports, three MII input ports, and one expansion input port. The four bit data on the three MII ports is translated to five bit data before transferring on the internal data paths. Correspondingly there are eight physical output ports, three MII output ports, and one expansion output port. A physical bus switch consists of multiple buses and multiplexers which multiplex and demultiplex the different data paths. For example, if only port five has activity, data from port five will be driven to port 0 through 4 and 6 to 7 outputs, the MII ports A, B, and C output, and the expansion port output. An idle pattern ("111111") is driven to port five output. This is a basic repeating function according to the standard. If more than one port have activity, then a collision is indicated. In such case, the jam patterns are sent to all ports until the collision stops. If there is no activity at all, the idle signal is sent to all ports.

The MII ports which receive input data to the repeater have corresponding enable signals TXEN-A, TXEN-B, and TXEN-C. These three signals are OR'd together and treated as one activity by the repeater core state machine. The MII activity is different from activity coming from the physical ports in the following two areas. (1) the transmit enable signals are synchronized with the TXCLK already. (2) these inputs are not qualified by the carrier integrity monitor. The transmit data received by the multiport repeater from the MII interface is also synchronized with the transmit clock, so no elastic buffer is needed on this interface. The three data transmit data inputs are multiplexed into one four bit data path at the input of a four bit/five bit encoder, in which the multiplexer is controlled by the transmit enable signals. If more than one transmit enable is asserted, a collision occurred and the jam signal is asserted to all ports.

The three MII ports share several pins, particularly on the output side. Thus, all three MII ports share the receive data bus RXD3:0, receive clock RXCLK, and the receive error signal RXER, and the collision signal COL. Each MII port has an individual CRS and RXDV signals. Assuming MII is transmitting, the RXDV-A signal will not be asserted because of loop back data from the repeater. The CRS signal will be the loop back of the transmit enable signal. The data path loop back is from the transmit data to the four bit/five bit encoder to the repeater core, through a five bit/four bit encoder, to the receive data bus RXD [3:0]. The receive clock on the media independent interface is actually a copy of the transmit clock, whether the packets come from the physical ports, the MII ports, or the expansion port.

Within the repeater core, a carrier integrity monitor state machine, as specified by the 100BASE-T standard, is executed. The state machine causes a jam sequence to be transmitted to all the ports in the multiport repeater if a degraded signal is received at any one port. When repeaters are cascaded according to the present invention, this information about degraded signals needs to be propagated to the cascaded repeaters. Therefore, the expansion port communicates not only collision detection but degraded signal detection across the expansion port to the neighboring devices. The two pins JAMI and JAMO are used to provide this function. If the multiport repeater senses a collision among its eight ports, or any of its ports has received a degraded signal, then the JAMO signal is asserted. The JAMI signal is asserted by another multiport repeater or external arbitration logic if a jam sequence is being transmitted by other multiport repeaters. The jam sequence from other multiport repeaters could be the result of a collision or the detection of degraded signals.

Figure 4:
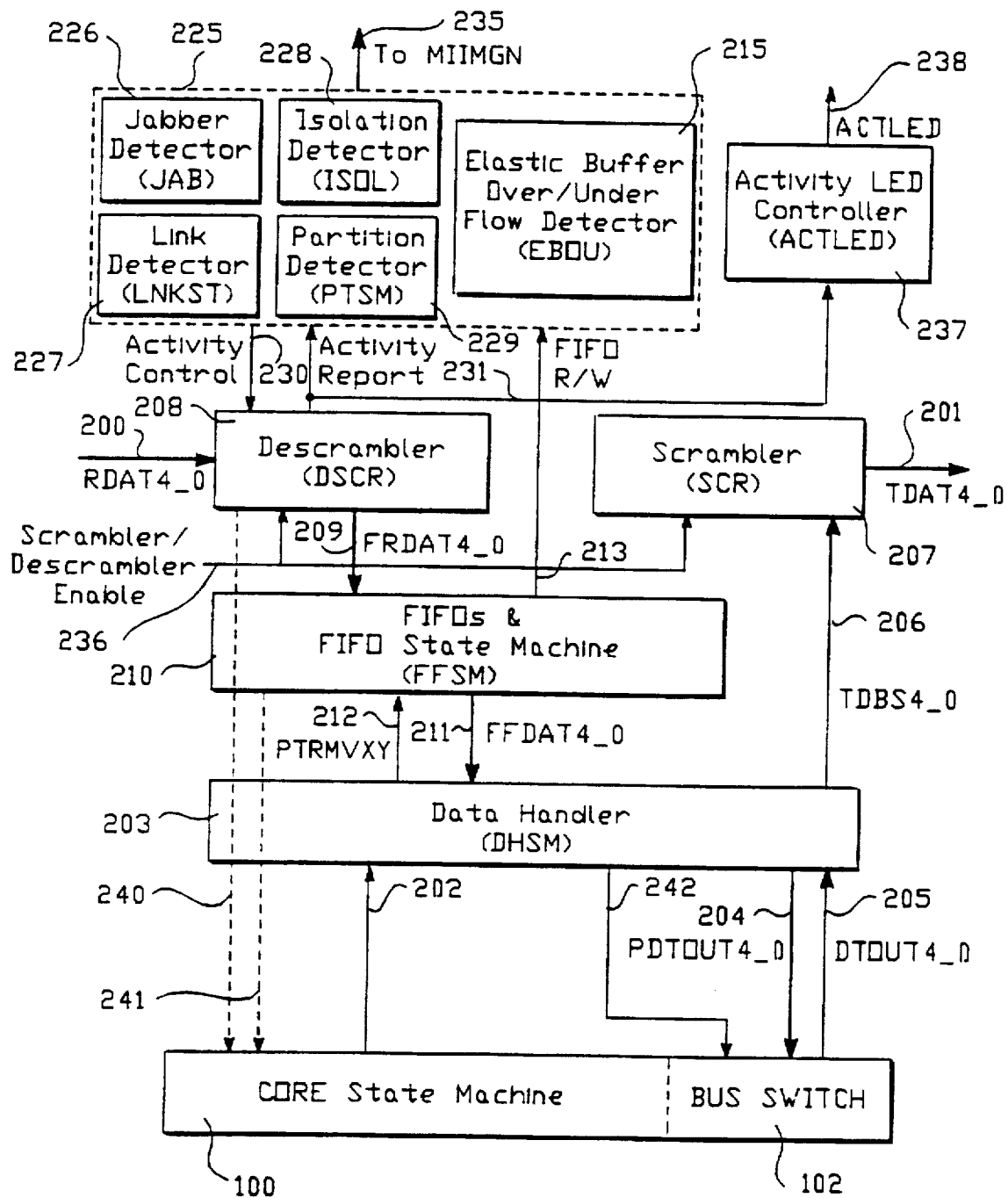
FIG. 4 is a functional block diagram of the media dependent port for the multiport repeater of FIG. 2.

FIG. 4 is a functional diagram of the PORTX block 106, which provides media dependent circuits for each of the physical layer ports on the device. FIG. 4 illustrates the received data on line 200 and the transmit data on line 201. Control signals (copyx/quietx/comcol/foenx/onlytxx/mempx) from the core state machine are received on lines 202 in a data handler block 203. Port data is supplied through the data handler block 203 on line 204 to the bus switch 102, and data from the bus switch 102 is supplied on line 205 to the data handler 203. Outgoing data from the data handler 203 is supplied on line 206 to scramble logic 207. From the scramble logic 207, the data is output on line 201. Incoming data from the receive data path 200 is supplied through the descrambler logic 208 across line 209 to a FIFO (eight nibbles deep) and FIFO state machine block 210. This block supplies FIFO data on lines 211 to the data handler block 203, which transfers the data up to the bus switch on lines 204. The data handler supplies control signals on line 212 to the FIFOs and FIFO state machine 210. In addition, the FIFO state machine supplies control signals on line 213 to an elastic buffer over and under flow detector 215. In addition, each port has standard logic functions 225 including a jammer detector 226, a link detector 227, an isolation detector 228, and a partition detector 229. These blocks perform the standard functions specified according to the 802.3u standard. These blocks supply activity control signals on line 230 to the descrambler circuitry and receive activity report signals on line 231 from the descrambler circuitry 208. In addition, status signals are supplied to the media independent interface management logic 112 on line 235.

Also as show in FIG. 4 is the scrambler/descrambler enable signal on line 236. This signal is received from the internal registers 108 as described in more detail below. When the scrambler is disabled, then the data passes through unscrambled. When it is enabled, then a random number is combined with the data as specified in the 802.3u standard The PORTX block includes an activity LED controller 237 for the port, which supplies the ACTLED output signal on line 238.

The PORTX block in FIG. 4 performs packet reception, packet transmission, collision detection, and jam generation, and provides link up, isolation, jammer and partition detectors. In addition, different /J/K/ format handling is provided within each port.

The packet reception process operates as follows. If the descrambler 208 and scrambler 207 are enabled, while receive data is idle, the logic in the descrambler will try to synchronize the scrambler's random number. When the descrambler's random number generator is synchronous to the scrambler's and the sequence is locked, incoming data on RDAT line 200 will be descrambled by the descrambler and the descrambled data will be fed into the FIFO 210 directly.

Whenever there is activity on RDAT, the descrambler tries to trace consecutive two 0 bits. If this condition is true, then the descrambler will send a carrier on flag (carryx) on line 240 to the core state machine 100, and data handling state machine 203 and the FIFO state machine 210. The FIFO state machine 210 will remember the current FIFO write pointer and make the FIFO read pointer one bit ahead of the write pointer, e.g. if the write pointer equals 00010000, the read pointer will be shifted to 00100000. Also if the write pointer is equal to 10000000, then the read pointer will be shifted to 00000001.

The read pointer will not proceed until the port "pointer move enable" signal on line 212 from the data handling state machine is active. The descrambler will keep monitoring incoming data on receive data until it recognizes the /J/K/ sequence is available for this incoming packet or not. In either case, if /J/ or /K/ is lost on the receive data, then the error signal (prxerrx) will be set by the descrambler and this status sent to the core state machine and data handling state machine simultaneously on line 240. In addition, the repeater will generate the jam pattern. If the error signal is low, and the /J/K/ pattern is successfully detected, then the data handling state machine will select the data path of the FIFO and send the data on line 204 onto the internal bus for transmission processing. Meanwhile the pointer move enable signal on line 212 will be sent to the FIFO state machine 210 to release the lock on the FIFO read pointer for the next enable data processing. In one implementation, an eight level FIFO is utilized having six bits per level. Five levels are used to store the five bit data, and the rest to store status. If the carrier is off as indicated by a signal (carryx) on line 240, then the status bit will be on. The status bit is forwarded to the core state machine to inform the core state machine that all data in the FIFO is cleaned up and allow the core state machine to return to the idle state.

If the scrambler and descrambler are disabled, then incoming data is fed to the FIFO directly, passing by the descrambler's function. The descrambler will monitor for the /J/K/ sequence of incoming packet no matter whether the scrambler is enabled or not.

The elastic buffer and overflow detector 215 sets an under/overflow flag in the case that the FIFO read pointer and the FIFO write pointer have the same value. This flag is sent to the STATPIN output pin. It is also sent to the media independent interface management block and stored in an internal register there.

The packet transmission process involves obtaining data from the DTOUT bus 205 from the receiving port. The data handling state machine will generate a port output select signal according to the command received from the core state machine on line 202 and make data ready on the transmit data before scrambler bus 206. Data on bus 206 is sent to the scrambler block for further transmit processing. If the scrambler 207 is enabled, then the data on the bus 206 is added with a random number generated in the descrambler 208 before it is sent on the output bus 201. If the scrambler is disabled, then the data on bus 206 is transmitted directly to the output bus 201. When successfully sent, this status (dtsndx) is reported on line 241 to the core state machine 100.

The collision detection and forcing the jam signal function is also incorporated in each port as shown in FIG. 4. The multiport repeater generates a jam pattern in two conditions. The first is a collision detected, that is two or more ports receive data at the same time, and the second is a forced jam. A collision occurs when two or more ports are receiving data, no matter whether the two ports receiving data have a successful start of stream delimiter /J/K/ detection or not. A forced jam is generated when an incoming packet on a port lacks either the /J/ or the /K/ pattern, or both. If either of these two conditions occurs, the data handling state machine 203 sets a control signal (ojkenx) on line 242 to force the jam pattern.

The link, isolation, jabber and partition detectors in block 225 command these standard functions specified in the IEEE standard 802.3u. These blocks are used to qualify the carrier detect function performed by the descrambler circuitry 208. A preferred embodiment of the present invention, allows the data handler 203 to detect shifted versions of the /J/K/ pattern. If any of the shifted version, for which the data handler is set up, is received, then the packet is processed as if properly received. Thus, no forced jam function is generated in these conditions.

Figure 5:
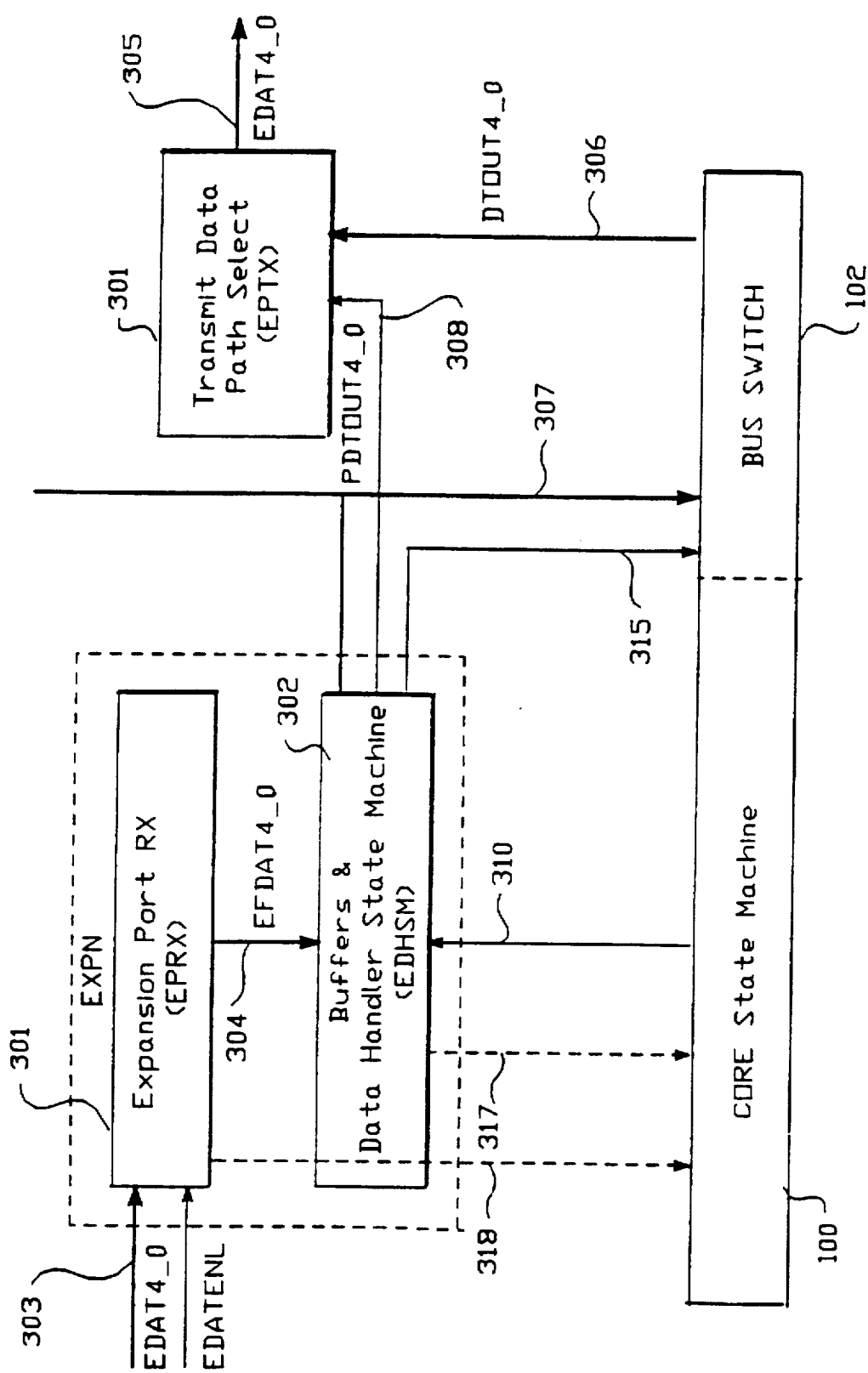
FIG. 5 is a functional block diagram of the expansion port for the multiport repeater of FIG. 2.

FIG. 5 is a functional block diagram of the expansion port used in the system of FIG. 2. The expansion port includes an expansion port receive block 300, a transmit path data selection block 301, and a buffer and data handler state machine 302 for the expansion port.

The expansion port receive block is similar to the descrambler 208 in the physical media dependent ports as shown in FIG. 4. However, there is no descrambler. Incoming data from the EDAT bus 303 is supplied to the expansion port receive block. This data is latched on the rising edge of the transmit clock TCLK. Latched data is sent to the buffers and data handler state machine 302 on line 304.

The expansion port data handler and buffers 302 are similar to the data handler state machine 203 in the physical media dependent ports. There are three levels of buffers located in this module, in addition to the state machine. Because both the output and input use the transmit clock, no FIFO is necessary. This module also provides the output data path EDATO on line 305. Data from the internal bus switch is received at the data path selection block 301 on line 306. Data is supplied out to the internal bus switch on line 307 from the data handler state machine 302 with /J/K/ delimiter signal (ojkenep) on line 315. The data handler state machine 302 generates the control signal on line 308 which controls the output data path selected by the path select logic 301. This block 301 operates under control of the core state machine signals (copyep/quietep/comcol/cboenep/onlyep/memep) as indicated by line 310. Also, the expansion port receive block supplies receive error and carrier status information to the core state machine on lines 317 (edtxnd) and 318 (eprxerr/scarry).

Figure 6:
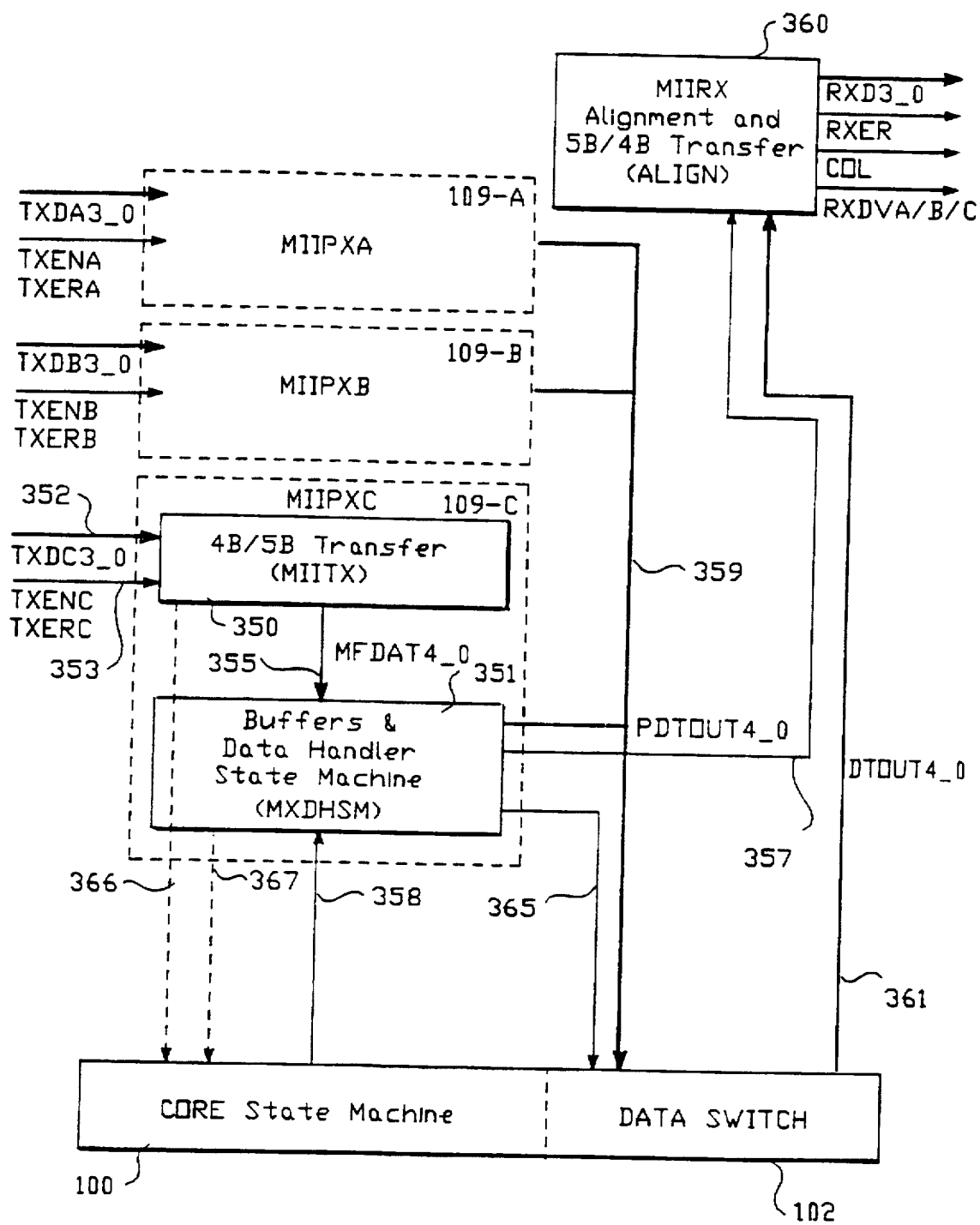
FIG. 6 is a functional block diagram of the media independent interface block in the multiport repeater of FIG. 2.

FIG. 6 illustrates the structure of the media independent interface for each of the three MIIs 109-A through 109-C of FIG. 2. Each of the three MIIs includes a media independent transfer block 350, a buffer and data handler state machine block 351. The media independent transmit block 350 receives the transmit data TXD on line 352, the transmit error TXER and the transmit enable TXEN on line 353. These functional blocks are similar to those in the physical ports, except that the transmit data incoming on line 352 is four bits instead of five bits. In the media independent interface port block 350, as shown in FIG. 6, incoming data on the TXD four bit bus is latched on the rising edge of the TXCLK. Latched data is translated to the five bit data and translates the preamble to the five bit format. The interface block 350 supplies five bit data out on line 355 to the buffer and data handler state machine 351. The buffer and data handler state machine 351 is similar to that in the expansion port, except that it does not provide an output data path. Instead, this data handler state machine 351 only outputs the control signal POSEL on line 357 according to control signals (copymc/quietmc/comcol/cboeumc/onlymc) from the control state machine on line 358, and supplies that control signal to the alignment functional block 360. Also, carrier status signals are supplied on lines 366 (mcalive) and 367 (mcdtsnd) to the core state machine 100, indicating activity and successful sending of data, respectively. Data from the buffers and data handler state machine 351 is supplied on the PDTOUT signal line 359 to the bus switch 102 along with the /J/K/ control signals (ojkenmc) for alignment of data on line 365.

The alignment block 360 receives data from the bus switch 102 in 5 bit format on line 361. Reception and transmission in the same port is mutually exclusive, except in the collision state. Data ready to be sent out is available in the five bit data out bus 361, latched by the 25 megaHertz clock in the alignment block 360. Because the incoming five bit data may not be well aligned, the alignment block aligns the five bit data before five bit to four bit translation proceeds for supplying out on the media independent interfaces shared output bus RXD [3:0]. The alignment block 360 also translates the well aligned five bit data into the preamble format for the four bit data. The four bit data is then transmitted on the receive data output which is shared by all the media independent interfaces on the falling edge of the 25 megaHertz clock.

The alignment block 360 also generates the valid receive signals RXDVA, RXDVB, and RXDVC for each of the three MII interfaces.

Another function of the data handler state machine 351 in the media independent interface ports 350 is to ensure that all the carriers are available on the physical ports before transmitting data out. Thus, the data handler state machine counts for nibbles of input data being loaded into the buffer before checking to ensure that all the ports have carrier available.

In the block 360, the five bit to four bit translation is executed. Thus, when a signal such as TXENA is high, data on the incoming bus TXDA is translated from four bit code to five bit code first. Then the preamble is translated to the /J/ and /K/ format in the five bit code. This data is then fed into the buffer, such as across bus 355.

In the alignment block, the receive data bus RXD3-0 and the receive data valid signals RXDVA through RXDVC, are asserted only when there is a copy signal for each of the three media independent interfaces 109-A, 109-B, and 109-C. In this case, the POSELMA through POSELMC signals (see line 57) are all asserted, the data valid signals are generated and data is ready to be transmitted on the RXD bus.

The alignment block will translate the /J/K/ and the preamble of the normal five bit packet. Also, the alignment block removes the /T/R/ segment at the end of the normal five bit packet. Thus, it is not transmitted out the RXD port. In the case of a five bit packet which comes without the /T/R/ segment at the end of the packet, then a "premature ending packet" is detected. If a premature ending packet is detected, then the receive error signal RXER is asserted by the alignment block. The RXER signal is also asserted whenever any of TXERA, TXERB, or TXERC are asserted. A third possibility for assertion of the RXER signal by the alignment block is when an invalid code is detected by the alignment block. This invalid code is specified in the 100BASE-T standard.

Furthermore, whenever a TXERA, TXERB, TXERC signal is asserted, or an invalid five bit code is detected by the alignment block, then the data on the RXD bus is forced to all zeroes.

Figure 7:
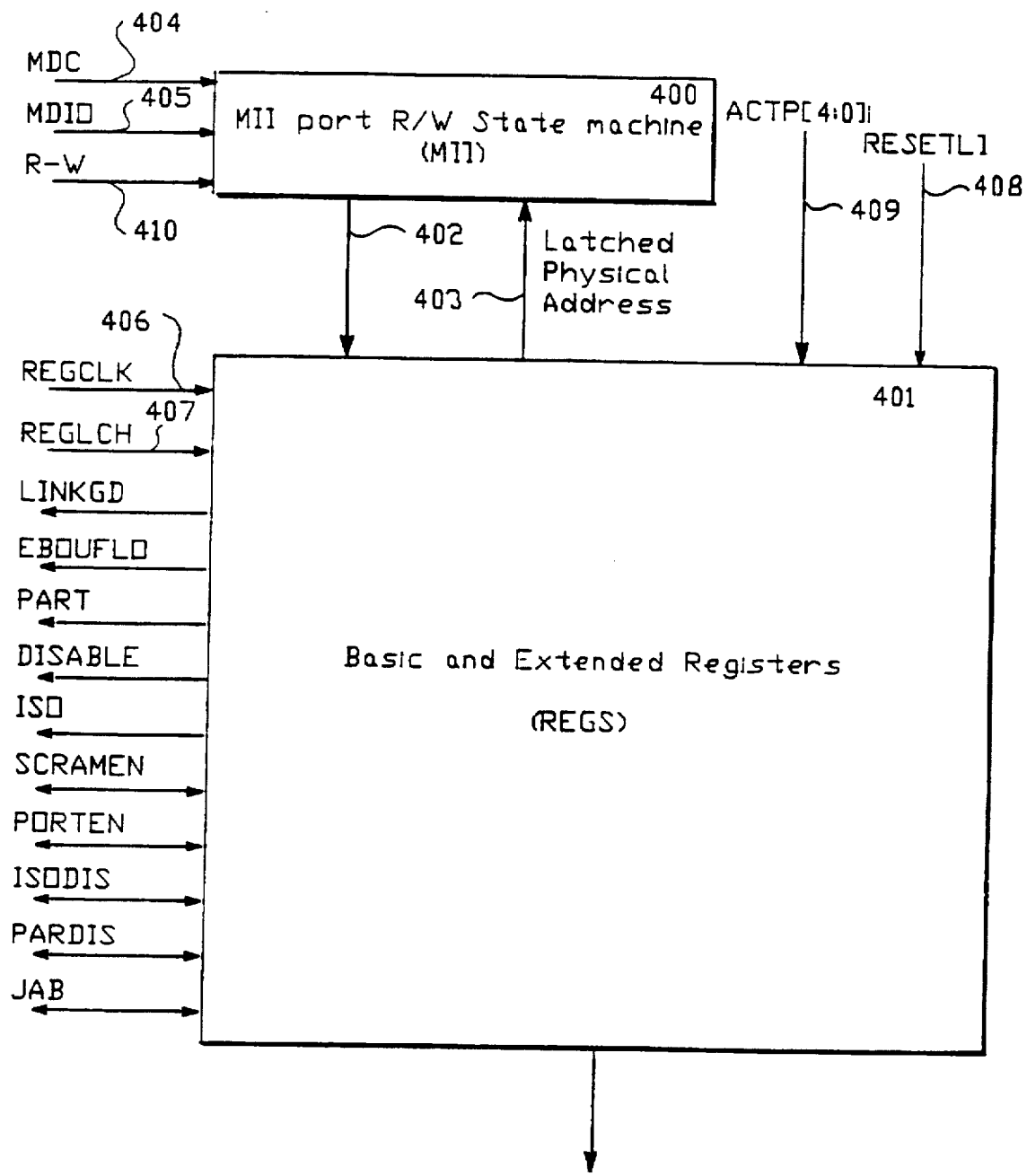
FIG. 7 is a functional block diagram of the management port and internal registers in the multiport repeater of FIG. 2.

FIG. 7 illustrates the management port and internal registers in the media independent management block 108 of FIG. 2. This block includes the MII read/write state machine 400 specified according to the 802.3u standard. It also includes the basic and extended register file 401 (including the registers which are specified below). In response to the standard protocol, control signals are supplied on line 402 for reading and writing the basic and extended registers 401. The physical address for the repeater is supplied from the register set 401 across line 403 to the state machine 400.

The basic and extended registers 401 store all the status specified in the industry standard. According to the present invention there are two ways to access this block. The first one is read/write control signal from the media independent interface as specified according to the standard using the MDC and MDIO signals on lines 404 and 405 and the R-W signal on line 410. The other way is using the read and write signals from the register access pins REGCLK and REGLCH on line 406 and 407 respectively and the other register access pins shown in the figure and specified above. A reset signal on line 408 and port activity signals on lines 409 are generated at the physical ports and in the control state machine for maintaining status registers in the register set 401.

All the registers can be accessed through MII's MDC and MDIO. Although the multiport repeater connects to multiple PHY devices, they are all configured identically with respect to the basic registers of the 802.3u standard. Each repeater has only one PHY address as defined by PHYADDR[4-0] pins. If multiple repeaters are on the same MDIO bus, each of them should have different PHY address. Other PHY devices (e.g. T4 transceivers) are also allowed to be managed with the same management interface as long as PHY address of each device is distinct.

The "Port Control" register defined below can be characterized as a media type register. It specifies whether interface should provide 100BASE-FX or 100BASE-TX services.

Another way to access registers is through register access pins. Register 17 (Scrambler Enable and Port Enable), Register 18 (Link Status, Partition Status), Register 19 (Elastic Buffer Status and Jabber Status), Register 20 (Isolation Status), Register 21 (Isolation Disable and Partition Disable) can also be read through SCRAMEN, PORTEN, LINKGD, PART, EBOUFLO, JAB, ISO, and PARDIS pins respectively. Register 17 and Register 21 can also be written through SCRAMEN, PORTEN, ISODIS and PARDIS, respectively. The exception is register 16 (Port reset register) which can only be accessed through MDC and MDIO. The register access pins facilitate a simple read/write protocol suitable for hardware-only configuration and status display design.

The following table specifies the extended registers according to one embodiment of the present invention. In the tables, "R/W" means read/write and "RO" means read only.

Port Reset register (register 16) (R/W)

| Reg. Bit | Name | Description | R/W |
| --- | --- | --- | --- |
| 16.15:8 | Reserved | Ignored when read | RO |
| 16.7 | ResetP7 | 1 = reset Port 7 logic<br>0 = not reset Port 7 logic.<br>Returns '0' when read after asserting RESET pin | R/W |
| 16.6 | ResetP6 | 1 = reset Port 6 logic<br>0 = not reset Port 6 logic | R/W |
| 16.5 | ResetP5 | 1 = reset Port 5 logic<br>0 = not reset Port 5 logic | R/W |
| 16.4 | ResetP4 | 1 = reset Port 4 logic<br>0 = not reset Port 4 logic | R/W |
| 16.3 | ResetP3 | 1 = reset Port 3 logic<br>0 = not reset Port 3 logic | R/W |
| 16.2 | ResetP2 | 1 = reset Port 2 logic<br>0 = not reset Port 2 logic | R/W |
| 16.1 | ResetP1 | 1 = reset Port 1 logic<br>0 = not reset Port 1 logic | R/W |
| 16.0 | ResetP0 | 1 = reset Port 0 logic<br>0 = not reset Port 0 logic | R/W |

Port Control register (register 17) (R/W)

| Reg. Bit | Name | Description | R/W |
| --- | --- | --- | --- |
| 17.15 | ScrEnP7 | 1 = Enable Scrambler/Descrambler at Port 7 -- TX<br>0 = Disable Scrambler/Descrambler at Port 7 -- FX<br>Returns '1' when read after reset. | R/W |
| 17.14 | ScrEnP6 | 1 = Enable Scrambler/Descrambler at Port 6 -- TX<br>0 = Disable Scrambler/Descrambler at Port 6 -- FX<br>Returns '1' when read after reset. | R/W |
| 17.13 | ScrEnP5 | 1 = Enable Scrambler/Descrambler at Port 5 -- TX<br>0 = Disable Scrambler/Descrambler at Port 5 -- FX<br>Returns '1' when read after reset. | R/W |
| 17.12 | ScrEnP4 | 1 = Enable Scrambler/Descrambler at Port 4 -- TX<br>0 = Disable Scrambler/Descrambler at Port 4 -- FX<br>Returns '1' when read after reset. | R/W |
| 17.11 | ScrEnP3 | 1 = Enable Scrambler/Descrambler at Port 3 -- TX<br>0 = Disable Scrambler/Descrambler at Port 3 -- FX<br>Returns '1' when read after reset. | R/W |
| 17.10 | ScrEnP2 | 1 = Enable Scrambler/Descrambler at Port 2 -- TX<br>0 = Disable Scrambler/Descrambler at Port 2 -- FX<br>Returns '1' when read after reset. | R/W |
| 17.9 | ScrEnP1 | 1 = Enable Scrambler/Descrambler at Port 1 -- TX<br>0 = Disable Scrambler/Descrambler at Port 1 -- FX<br>Returns '1' when read after reset. | R/W |
| 17.8 | ScrEnP0 | 1 = Enable Scrambler/Descrambler at Port 0 -- TX<br>0 = Disable Scrambler/Descrambler at Port 0 -- FX<br>Returns '1' when read after reset. | R/W |
| 17.7 | EnP7 | 1 = Enable receive and transmit functions at Port 7<br>0 = Disable receive and transmit functions at Port 7<br>Returns '1' when read after reset. | R/W |
| 17.6 | EnP6 | 1 = Enable receive and transmit functions at Port 6<br>0 =Disable receive and transmit functions at Port 6<br>Returns '1' when read after reset. | R/W |
| 17.5 | EnP5 | 1 = Enable receive and transmit functions at Port 5<br>0 = Disable receive and transmit functions at Port 5<br>Returns '1' when read after reset. | R/W |

-continued

| Reg. Bit | Name | Description | R/W |
|---|---|---|---|
| 17.4 | EnP4 | 1 = Enable receive and transmit functions at Port 4<br>0 = Disable receive and transmit functions at Port 4<br>Returns '1' when read after reset. | R/W |
| 17.3 | EnP3 | 1 = Enable receive and transmit functions at Port 3<br>0 = Disable receive and transmit functions at Port 3<br>Returns '1' when read after reset. | R/W |
| 17.2 | EnP2 | 1 = Enable receive and transmit functions at Port 2<br>0 = Disable receive and transmit functions at Port 2<br>Returns '1' when read after reset. | R/W |
| 17.1 | EnP1 | 1 = Enable receive and transmit functions at Port 1<br>0 = Disable receive and transmit functions at Port 1<br>Returns '1' when read after reset. | R/W |
| 17.0 | EnP0 | 1 = Enable receive and transmit functions at Port 0<br>0 = Disable receive and transmit functions at Port 0<br>Returns '1' when read after reset. | R/W |

Link and Partition Status Register (register 18) (RO)

| Reg. Bit | Name | Description | R/W |
|---|---|---|---|
| 18.15 | LinkP7 | 1 = Link_status OK at Port 7,0 = Link_status not OK at Port 7. Set to '1' by Link Monitor State Machine, Cleared to '0' by asserting RBSBT pin or writing to Port Reset register. | RO |
| 18.14 | LinkP6 | 1 = Link_status OK at Port 6,0 = Link_status not OK at Port 6. | RO |
| 18.13 | LinkP5 | 1 = Link_status OK at Port 5,0 = Link_status not OK at Port 5. | RO |
| 18.12 | LinkP4 | 1 = Link_status OK at Port 4,0 = Link_status not OK at Port 4. | RO |
| 18.11 | LinkP3 | 1 = Link_status OK at Port 3,0 = Link_status not OK at Port 3. | RO |
| 18.10 | LinkP2 | 1 = Link_status OK at Port 2,0 = Link_status not OK at Port 2. | RO |
| 18.9 | LinkP1 | 1 = Link_status OK at Port 1,0 = Link_status not OK at Port 1. | RO |
| 18.8 | LinkP0 | 1 = Link_status OK at Port 0 = Link_status not OK at Port 0. | RO |
| 18.7 | PartP7 | 1 = Port 7 has been partitioned, 0 = Port 7 has not been partitioned. Set to '1' by Partition State Machine, Cleared to '0' by asserting RESET pin or writing to Port Reset register. | RO |
| 18.6 | PartP6 | 1 = Port 6 has been partitioned, 0 = Port 6 has not been partitioned. | RO |
| 18.5 | PartP5 | 1 = Port 5 has been partitioned, 0 = Port 5 has not been partitioned. | RO |
| 18.4 | PartP4 | 1 = Port 4 has been partitioned, 0 = Port 4 has not been partitioned. | RO |
| 18.3 | PartP3 | 1 = Port 3 has been partitioned, 0 = Port 3 has not been partitioned. | RO |
| 18.2 | PartP2 | 1 = Port 2 has been partitioned, 0 = Port 2 has not been partitioned. | RO |
| 18.1 | PartP1 | 1 = Port 1 has been partitioned, 0 Port 1 has not been partitioned. | RO |
| 18.0 | PartP0 | 1 = Port 0 has been partitioned, 0 = Port 0 has not been partitioned. | RO |

EB Over/Underflow and Jabber Status Register (register 19) (RO)

| Reg. Bit | Name | Description | R/W |
|---|---|---|---|
| 19.15 | EBOUFLP7 | 1 = Elastic Buffer Over/Underflow at Port 7,<br>0 = No Elastic Buffer Over/Underflow at Port 7.<br>Set to '1' by Elastic Buffer control logic, Cleared to '0' by asserting RESET pin or writing to Port Reset Register. | RO |
| 19.14 | EBOUFLP6 | 1 = Elastic Buffer Over/Underflow at Port 6,<br>0 = No Elastic Buffer Over/Underflow at Port 6. | RO |
| 19.13 | EBOUFLP5 | 1 = Elastic Buffer Over/Underflow at Port 5,<br>0 = No Elastic Buffer Over/Underflow at Port 5. | RO |
| 19.12 | EBOUFLP4 | 1 = Elastic Buffer Over/Underflow at Port 4,<br>0 = No Elastic Buffer Over/Underflow at Port 4. | RO |
| 19.11 | EBOUFLP3 | 1 = Elastic Buffer Over/Underflow at Port 3,<br>0 = No Elastic Buffer Over/Underflow at Port 3. | RO |
| 19.10 | EBOUFLP2 | 1 = Elastic Buffer Over/Underflow at Port 2,<br>0 = No Elastic Buffer Over/Underflow at Port 2. | RO |
| 19.9 | EBOUFLP1 | 1 = Elastic Buffer Over/Underflow at Port 1,<br>0 = No Elastic Buffer Over/Underflow at Port 1. | RO |
| 19.8 | EBOUFLP0 | 1 = Elastic Buffer Over/Underflow at Port 0,<br>0 = No Elastic Buffer Over/Underflow at Port 0. | RO |
| 19.7 | JABP7 | 1 = Receive Jabber Active at Port 7, 0 = Receive Jabber is not Active at Port 7.<br>Set to '1' by Receive Timer State Machine, Cleared to '0' by asserting RESET pin or writing to Port Reset Register. | RO |
| 19.6 | JABP6 | 1 = Receive Jabber Active at Port 6, 0 = Receive Jabber is not Active at Port 6. | RO |
| 19.5 | JABP5 | 1 = Receive Jabber Active at Port 5, 0 = Receive Jabber is not Active at Port 5. | RO |
| 19.4 | JABP4 | 1 = Receive Jabber Active at Port 4, 0 = Receive Jabber | RO |

-continued

| Reg. Bit | Name | Description | R/W |
|---|---|---|---|
| 19.3 | JABP3 | is not Active at Port 4.<br>1 = Receive Jabber Active at Port 3, 0 = Receive Jabber is not Active at Port 3. | RO |
| 19.2 | JABP2 | 1 = Receive Jabber Active at Port 2, 0 = Receive Jabber is not Active at Port 2. | RO |
| 19.1 | JABP1 | 1 = Receive Jabber Active at Port 1, 0 = Receive Jabber is not Active at Port 1. | RO |
| 19.0 | JABP0 | 1 = Receive Jabber Active at Port 0, 0 = Receive Jabber is not Active at Port 0. | RO |

Isolation Status Register (register 20) (RO)

| Bit | Name | Description | R/W |
|---|---|---|---|
| 20.15:8 | Reserved | | RO |
| 20.7 | ISOP7 | 1 = Port Isolation is occurring at Port 7, 0 = Port Isolation is not occurring at Port 7. Set to '1' by CIM state machine, Cleared to '0' by asserting RESET pin or writing to Port Reset Register or by CIM state machine. | RO |
| 20.6 | ISOP6 | 1 = Port Isolation is occurring at Port 6, 0 = Port Isolation is not occurring at Port 6. Port 7. | RO |
| 20.5 | ISOP5 | 1 = Port Isolation is occurring at Port 5; 0 = Port Isolation is not occurring at Port 5. Port 7. | RO |
| 20.4 | ISOP4 | 1 = Port Isolation is occurring at Port 4, 0 = Port Isolation is not occurring at Port 4. Port 7. | RO |
| 20.3 | ISOP3 | 1 = Port Isolation is occurring at Port 3, 0 = Port Isolation is not occurring at Port 3. Port 7. | RO |
| 20.2 | ISOP2 | 1 = Port Isolation is occurring at Port 2, 0 = Port Isolation is not occurring at Port 2. Port 7. | RO |
| 20.1 | ISOP1 | 1 = Port Isolation is occurring at Port 1, 0 = Port Isolation is not occurring at Port 1. Port 7. | RO |
| 20.0 | ISOP0 | 1 = Port Isolation is occurring at Port 0, 0 = Port Isolation is not occurring at Port 0. Port 7. | RO |

Partition Disable Register (register 21) (R/W)

| Reg. Bit | Name | Description | R/W |
|---|---|---|---|
| 21.15 | ISODIS7 | 1 = Port Isolation function is disabled at Port 7, 0 = Port Isolation function is not disabled at Port 7. Returns '0' when read after reset. | R/W |
| 21.14 | ISODIS6 | 1 = Port Isolation function is disabled at Port 6, 0 = Port Isolation function is not disabled at Port 6. | R/W |
| 21.13 | ISODIS5 | 1 = Port Isolation function is disabled at Port 5, | R/W |
| 21.12 | ISODIS4 | 0 = Port Isolation function is not disabled at Port 5.<br>1 = Port Isolation function is disabled at Port 4,<br>0 = Port Isolation function is not disabled at Port 4. | R/W |
| 21.11 | ISODIS3 | 1 = Port Isolation function is disabled at Port 3,<br>0 = Port Isolation function is not disabled at Port 3. | R/W |
| 21.10 | ISODIS2 | 1 = Port Isolation function is disabled at Port 2,<br>0 = Port Isolation function is not disabled at Port 2. | R/W |
| 21.9 | ISODIS1 | 1 = Port Isolation function is disabled at Port 1,<br>0 = Port Isolation function is not disabled at Port 1. | R/W |
| 21.8 | ISODIS0 | 1 = Port Isolation function is disabled at Port 0,<br>0 = Port Isolation function is not disabled at Port 0. | R/W |
| 21.7 | PARDISP7 | 1 = Port Partition function is disabled at Port 7,<br>0 = Port Partition function is not disabled at Port 7. Returns '0' when read after reset. | R/W |
| 21.6 | PARDISP6 | 1 = Port Parition function is disabled at Port 6,<br>0 = Port Partition function is not disabled at Port 6. | R/W |
| 21.5 | PARDISP5 | 1 = Port Partition function is disabled at Port 5,<br>0 = Port Partition function is not disabled at Port 5. | R/W |
| 21.4 | PARDISP4 | 1 = Port Partition function is disabled at Port 4,<br>0 = Port Partition function is not disabled at Port 4. | R/W |
| 21.3 | PARDISP3 | 1 = Port Partition function is disabled at Port 3,<br>0 = Port Partition function is not disabled at Port 3. | R/W |
| 21.2 | PARDISP2 | 1 = Port Partition function is disabled at Port 2,<br>0 = Port Partition function is not disabled at Port 2. | R/W |
| 21.1 | PARDISP1 | 1 = Port Partition function is disabled at Port 1,<br>0 = Port Partition function is not disabled at Port 1. | R/W |
| 21.0 | PARDISP0 | 1 = Port Partition function is disabled at Port 0,<br>0 = Port Partition function is not disabled at Port 0. | R/W |

In the block 400, and block 401, a number of functions are carried out. First, registers 23 and 24 in the register set are utilized as buffers to temporarily store data from the outside world before the data is written into the internal registers. The input data is to be ready on the rising edge of the REGCK, and all the input data is written into the buffer on the rising edge of that clock. Logic in the register file 401 writes the data from the buffer to the internal registers 17 and 21 at the rising edge of REGLCHI. Also, data path selection is included because registers 17 and 21 can be accessed through the two different paths. Priority is assigned to the register access pins over the MDIO path. Whenever R/W signal is low, the function of the media independent interface will be disabled to prevent a conflict in condition.

Combinational logic is also included in the register file 401 to perform these scrambler/descrambler enable function discussed above, generation of the read/write enable signals for the registers, and an address decoder. The operation of a media independent interface MDIO and MDC path is specified in the standard in detail.

Figure 8:
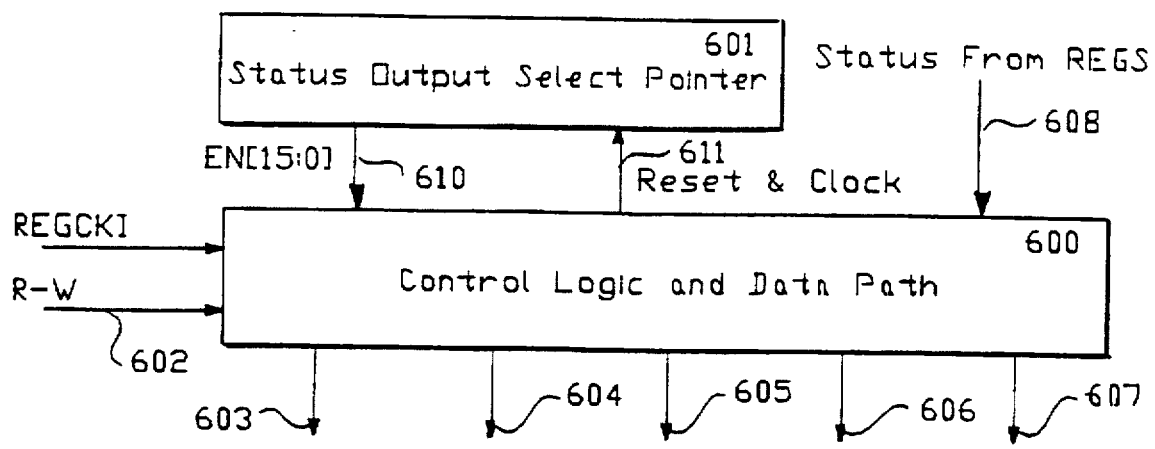
FIG. 8 is a functional block diagram of the register access logic in the multiport repeater of FIG. 2.
Figure 9:
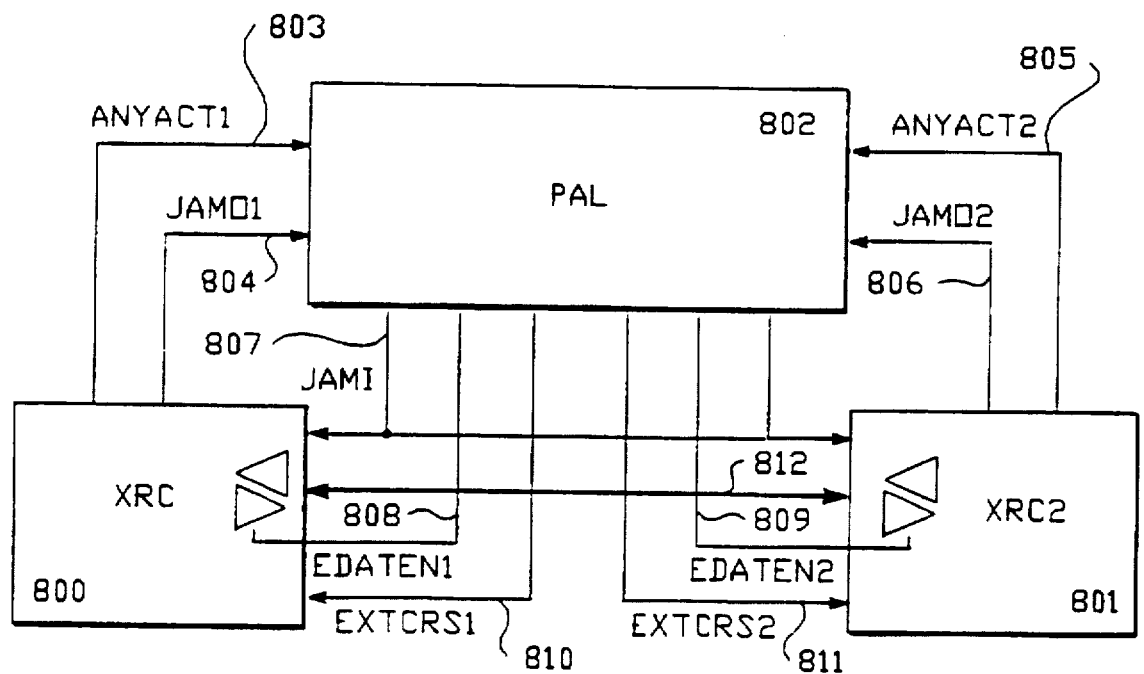
FIG. 9 is a system block diagram of two cascaded multiport repeaters according to the present invention.

FIG. 8 provides the functional block diagram of the register access logic. As shown in the figure, a control logic and data path block 600 is coupled with a status output select pointer block 601. The select pointer block 601 is implemented as a ring counter which provides enable signals to select a proper data path for access to the registers. When the read/write signal on line 602 is low, the ring counter is disabled. The control logic and data path block 600 generates reset and clock signals for the status output select pointer logic 601. Meanwhile, it provides data paths for proper output data to the register access pins 603 through 607 (described above). In addition, the control logic and data path block 600 receives status data on lines 608 from the register block shown in FIG. 6. Enable signals (one for each bit of the 16 bit registers) generated by the status output select pointer block 601 are supplied on line 611 to the control logic and data path block 600. Also, the control logic generates reset and clock signals on line 610 to the status output select pointer logic 601.

The expansion port according to one embodiment of the present invention requires some external arbiter logic. This arbiter logic is illustrated in FIG. 9. Thus, as shown in FIG. 9, there is a first multiport repeater 800 and a second multiport repeater 801. A programmable array logic device 802 is used to implement the arbitration logic.

The inputs the to programmable array logic device 802 include the ANYACT1 signal on line 803, the JAMO output signal on line 804 from the multiport repeater 800, ANYACT2 on line 805 and the JAMO signal on line 806 from the multiport repeater 801. The logic device generates the JAMI input signal on line 807, the EDATEN signals on line 808 for the repeater 800 and on line 809 for repeater 801, and the external carrier sense signals EXTCRS on line 810 for repeater 800 and on line 811 for repeater 801. The data path between the two repeaters is supplied across the EDAT bus on 812. The bus 812 is five bit wide data path which is not aligned on the symbol boundary. If there is any activity inside one of the repeaters, the ANYACT1 signal on line 803 or 805 is generated. If the repeater is transmitting a jam signal on any of the ports or media independent interfaces, then the JAMO signal is asserted on lines 804 or 806. During the assertion of the JAMO signal, the bus 812 is tristated. The multiport repeater sends the JAMI sequence to all the ports in response to the jam input signal on line 807 from the arbiter logic 802. As soon as the JAMI signal is turned off by the arbiter logic 802, the multiport repeater stops jamming. The external carrier sense signals on lines 810 and 811 indicate a presence of activity on the next multiport repeater in the sequence. All the control signals and data in the arbiter logic 802 are synchronized with the 50 megaHertz clock. The PAL equations (with reference to signal names shown in the figure) are as follows:

EXTCRS1=ANYACT2;
EXTCRS2=ANYACT2;
JAMI=(ANYACT1 * ANYAC2)+JAMO1+JAMO2;
EDATEN2=ANYACT1 & !ANYACT2;
EDATEN2=!ANYACT1 & ANYACT2;

Accordingly, a highly flexible and useful multiport repeater device has been provided, suitable to be implemented on a single integrated circuit. This circuit provides a plurality of physical ports, combined with one or more media independent interfaces. In addition, an expansion port is provided for the chip. This allows very flexible architectures for network systems, particularly those networks that operate according to the 100BASE-T standard with 100 megabit CSMA/CD type protocols.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An integrated circuit repeater, comprising:

a plurality of media dependent interfaces for connection to respective communication media;

repeater circuitry coupled to the plurality of media dependent interfaces which perform physical layer repeater functions for the plurality of media dependent interfaces; and a media independent interface, having an appearance of an interface on a transceiver coupled with the repeater circuitry, for connection of the plurality of media dependent interfaces with a corresponding data link layer medium access controller which has a complement to the media independent interface.

2. The integrated circuit repeater of claim 1, including:

interface control logic, including interface control and status registers for the plurality of media dependent interfaces, which manages physical layer receive and transmit functions on the plurality of media dependent interfaces for variant types of communication media; and a management interface, coupled with the interface control logic, responsive to a repeater address received at the management interface, to provide read and write access to the interface control and status registers for the plurality of media dependent interfaces.

3. The integrated circuit repeater of claim 2, wherein the interface control and status registers include:

a first set of registers specifying shared attributes of the plurality of media dependent interfaces; and a second set of registers specifying individual attributes of the plurality of media dependent interfaces.

4. The integrated circuit repeater of claim 2, wherein the management interface includes a serial port for reading and writing the interface control and status registers in response to the repeater address.

5. The integrated circuit repeater of claim 4, including a plurality of status pins providing access to selected data in the interface control and status registers.

6. The integrated circuit repeater of claim 2, wherein the interface control and status registers include a media type register which indicates one of a plurality of types of communication media for each of the plurality of media dependent interfaces, and wherein the interface control logic includes circuits responsive to the media type register which adapt the plurality of media dependent interfaces to the indicated types.

7. The integrated circuit repeater of claim 1, including at least one additional media independent interface coupled with the repeater circuitry, for connection of the plurality of media dependent interfaces with an additional data link layer medium access controller.

8. The integrated circuit repeater of claim 7, wherein said media independent interface includes a set of receive data output pins on the integrated circuit which supply received data to the corresponding data link layer medium access controller, and the additional media independent interface shares the set of receive data output pins with said media independent interface to supply received data to the additional data link layer medium access controller data.

9. The integrated circuit repeater of claim 1, including an expansion port which provides a physical layer interface to another integrated circuit repeater.

10. The integrated circuit repeater of claim 9, wherein the data is transmitted on the media dependent interfaces at a first clock rate, and data is transmitted through the expansion port at a second clock rate faster than the first clock rate.

11. The integrated circuit repeater of claim 1 0, wherein the second clock rate is twice the frequency of the first clock rate.

12. The integrated circuit repeater of claim 1, including an expansion port which provides a physical layer interface to another integrated circuit repeater; the expansion port including:

logic to propagate a signal indicating a collision within the integrated circuit repeater, and to indicate detection within the integrated circuit repeater of a receive error at one of the plurality of media dependent interfaces, through the expansion port to the other integrated circuit repeater.

13. The integrated circuit repeater of claim 1, wherein the plurality of media dependent interfaces and the media independent interface are compliant with 100BASE-T industry standard.

14. An integrated circuit repeater, comprising:

a plurality of media dependent interfaces for connection to respective 100BASE-T compliant communication media;

interface control logic, including interface control and status registers for the plurality of media dependent interfaces, which manages physical layer receive and transmit functions on the plurality of media dependent interfaces for variant types of communication media;

repeater circuitry coupled to the plurality of media dependent interfaces which perform physical layer repeater functions for the plurality of media dependent interfaces;

a media independent interface, emulating a connection to a transceiver, coupled with the repeater circuitry, for connection of the plurality of media dependent interfaces with a corresponding 100BASE-T compliant data link layer media access controller; and a management interface, coupled with the interface control logic, responsive to a repeater address received at the management interface, to provide read and write access to the interface control and status registers for the plurality of media dependent interfaces.

15. The integrated circuit repeater of claim 14, wherein the interface control and status registers include a media type register which indicates one of a plurality of types of communication media for each of the plurality of media dependent interfaces, and wherein the interface control logic includes circuits responsive to the media type register which adapt the plurality of media dependent interfaces to the indicated types.

16. The integrated circuit repeater of claim 14, including at least one additional media independent interface coupled with the plurality of media dependent interfaces, which shares the interface control logic with said media independent interface.

17. The integrated circuit repeater of claim 16, wherein said media independent interface includes a set of receive data output pins on the integrated circuit which supply received data to an external device, and the additional media independent interface shares the set of receive data out put pins with said media independent interface.

18. The integrated circuit repeater of claim 14, wherein the interface control and status registers include:

a first set of registers specifying shared attributes of the plurality of media dependent interfaces; and a second set of registers specifying individual attributes of the plurality of media dependent interfaces.

19. The integrated circuit repeater of claim 18, wherein the management interface includes a serial port for reading and writing the interface control and status registers in response to the repeater address.

20. The integrated circuit repeater of claim 19, including a plurality of status pins providing access to selected data in the interface control and status registers.

21. The integrated circuit repeater of claim 14, including an expansion port which provides a physical layer interface to another integrated circuit repeater.

22. The integrated circuit repeater of claim 21, wherein the data is transmitted on the media dependent interfaces at a first clock rate, and data is transmitted through the expansion port at a second clock rate faster than the first clock rate.

23. The integrated circuit repeater of claim 22, wherein the second clock rate is twice the frequency of the first clock rate.

24. The integrated circuit repeater of claim 14, including an expansion port which provides a physical layer interface to another integrated circuit repeater; the expansion port including:

logic to propagate a signal indicating a collision within the integrated circuit repeater, and to indicate detection within the integrated circuit repeater of a receive error at one of the plurality of media independent interfaces through the expansion port to the other integrated circuit repeater.

25. An integrated circuit repeater, comprising:

a plurality of media dependent interfaces for connection to respective 100BASE-T compliant communication media;

interface control logic, including a media type register which specifies one of a prespecified set of types of 100BASE-T compliant communication media for each of the plurality of media dependent interfaces, which manages physical layer receive and transmit functions on the plurality of media dependent interfaces for specified types of communication media;

repeater circuitry coupled to the plurality of media dependent interfaces which perform physical layer repeater functions for the plurality of media dependent interfaces; and a management interface, coupled with the interface control logic, to provide access to the media type register for specifying the variant types of communication media for the plurality of media dependent interfaces.

26. The integrated circuit repeater of claim 25, wherein the management interface is responsive to a repeater address received at the management interface, to access to the media type register.

27. The integrated circuit repeater of claim 26, wherein the management interface includes a serial port for writing to the media type register in response to the repeater address.

28. The integrated circuit repeater of claim 25, including:

a media independent interface coupled with the repeater circuitry, for connection of the plurality of media dependent interfaces with a corresponding data link layer media access controller.

29. The integrated circuit repeater of claim 25, wherein the interface control logic includes circuits responsive to the media type register which adapt the plurality of media dependent interfaces to the specified types.

30. An integrated circuit repeater comprising:

a plurality of media dependent interfaces for connection to respective communication media;

repeater circuitry, coupled to the plurality of media dependent interfaces, which performs physical layer repeater functions for the plurality of media dependent interfaces, including the detection of receive errors, and detection of collisions; and an expansion port coupled with the repeater circuitry, which provides a physical layer interface to another integrated circuit repeater, including logic for communicating the detection of collisions and the detection of receive errors to the other integrated circuit repeater; and wherein the expansion port operates at a clock rate faster than the clock rate of the media dependent interfaces for receiving or transmitting data.

31. The integrated circuit repeater of claim 30, wherein the clock rate of the expansion port for transmitting and receiving data is twice the clock rate of the plurality of media dependent interfaces for receiving and transmitting data.

32. The integrated circuit repeater of claim 30, further including:

a media independent interface coupled with the repeater circuitry for connection of the plurality of media dependent interfaces with a corresponding data link layer medium access controller.

33. The integrated circuit repeater of claim 30, wherein the plurality of media dependent interfaces are compliant with the 100BASE-T industry standard.

* * * * *